(12) United States Patent
Yoon et al.

(10) Patent No.: US 10,656,790 B2
(45) Date of Patent: May 19, 2020

(54) DISPLAY APPARATUS AND METHOD FOR DISPLAYING A SCREEN IN DISPLAY APPARATUS

(71) Applicant: Samsung Electronics Co., Ltd., Suwon-si, Gyeonggi-do (KR)

(72) Inventors: Min-kyoung Yoon, Seoul (KR); Sang-ok Cha, Suwon-si (KR); Young-jun Yoon, Seoul (KR); Joo-yeon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 826 days.

(21) Appl. No.: 14/859,960

(22) Filed: Sep. 21, 2015

(65) Prior Publication Data

US 2016/0092047 A1 Mar. 31, 2016

(30) Foreign Application Priority Data

Sep. 29, 2014 (KR) ........................ 10-2014-0130150

(51) Int. Cl.
*G06F 3/0482* (2013.01)
*G06F 3/0488* (2013.01)
*G06F 3/0486* (2013.01)
*G06F 3/023* (2006.01)

(52) U.S. Cl.
CPC .......... *G06F 3/0482* (2013.01); *G06F 3/0236* (2013.01); *G06F 3/0486* (2013.01); *G06F 3/04883* (2013.01); *G06F 3/04886* (2013.01); *G06F 2203/04806* (2013.01); *G06F 2203/04808* (2013.01)

(58) Field of Classification Search
CPC ............ G06F 2203/04806; G06F 2203/04803
See application file for complete search history.

(56) References Cited

U.S. PATENT DOCUMENTS 6,751,620 B2 * 6/2004 Orbanes ................ G06F 3/0346
6,975,335 B2 * 12/2005 Watanabe ............. G06F 3/0481
345/660

(Continued)

FOREIGN PATENT DOCUMENTS

EP     2 469 442 A1    6/2012
JP     2012-053581 A   3/2012

(Continued)

OTHER PUBLICATIONS

Accessibility in Windows Microsoft 2009 (Microsoft) (Year: 2009).*

(Continued)

*Primary Examiner* — William L Bashore
*Assistant Examiner* — Nathan K Shrewsbury
(74) *Attorney, Agent, or Firm* — Jefferson IP Law, LLP

(57) ABSTRACT

A display apparatus and a method for displaying a screen in a display apparatus are provided. The display apparatus and method of displaying a screen in a display apparatus includes setting an area of a display screen as a user designated area through an area designation user interface (UI) and when a preset event is generated, displaying at least one of a graphical user interface (GUI) and a portion of the display screen in the set user designated area, depending on the generated event type.

17 Claims, 38 Drawing Sheets

(56) References Cited

U.S. PATENT DOCUMENTS

| | | | | |
|---|---|---|---|---|
| 8,086,958 B2* | 12/2011 | Tokunaga | G06F 3/0481 | 715/243 |
| 8,176,438 B2* | 5/2012 | Zaman | G06F 3/0481 | 715/786 |
| 8,756,304 B2* | 6/2014 | Leacock | H04L 51/043 | 709/203 |
| 2002/0085035 A1* | 7/2002 | Orbanes | G06F 3/0481 | 715/764 |
| 2006/0022955 A1* | 2/2006 | Kennedy | G06F 3/0414 | 345/173 |
| 2007/0013722 A1* | 1/2007 | Souza | G06F 3/0481 | 345/660 |
| 2007/0247435 A1* | 10/2007 | Benko | G06F 3/0488 | 345/173 |
| 2008/0036732 A1* | 2/2008 | Wilson | G06F 3/017 | 345/156 |
| 2008/0060009 A1* | 3/2008 | Kelts | G06F 3/0481 | 725/39 |
| 2008/0168404 A1* | 7/2008 | Ording | G06F 3/0485 | 715/863 |
| 2010/0045705 A1* | 2/2010 | Vertegaal | G06F 3/0346 | 345/661 |
| 2010/0110012 A1* | 5/2010 | Maw | G06F 1/1616 | 345/169 |
| 2010/0295805 A1* | 11/2010 | Shin | G06F 3/04883 | 345/173 |
| 2011/0035664 A1* | 2/2011 | Cho | G06F 3/04886 | 715/702 |
| 2011/0078624 A1* | 3/2011 | Missig | G06F 3/04883 | 715/802 |
| 2011/0134126 A1* | 6/2011 | Miyazaki | G06F 3/04883 | 345/428 |
| 2011/0197156 A1* | 8/2011 | Strait | G06F 3/0481 | 715/771 |
| 2011/0271222 A1* | 11/2011 | Cho | G06F 3/0481 | 715/773 |
| 2012/0038679 A1* | 2/2012 | Yun | G06F 3/1454 | 345/667 |
| 2012/0154313 A1* | 6/2012 | Au | G06F 3/04883 | 345/173 |
| 2012/0176401 A1* | 7/2012 | Hayward | G06F 3/04845 | 345/619 |
| 2012/0274589 A1* | 11/2012 | De Angelo | G06F 3/011 | 345/173 |
| 2012/0302167 A1* | 11/2012 | Yun | G06F 40/171 | 455/41.2 |
| 2013/0076888 A1* | 3/2013 | Hibino | G02B 21/025 | 348/79 |
| 2013/0091411 A1* | 4/2013 | Rampson | G06F 40/242 | 715/224 |
| 2013/0113717 A1* | 5/2013 | Van Eerd | G06F 3/04883 | 345/173 |
| 2013/0120278 A1* | 5/2013 | Cantrell | G06F 3/04886 | 345/173 |
| 2013/0120292 A1* | 5/2013 | Gwak | G06F 3/0416 | 345/173 |
| 2013/0135234 A1* | 5/2013 | Hisano | G06F 3/017 | 345/173 |
| 2013/0212535 A1* | 8/2013 | Kim | G06F 3/0482 | 715/841 |
| 2013/0346913 A1* | 12/2013 | Smith | G06F 3/04883 | 715/784 |
| 2014/0013271 A1* | 1/2014 | Moore | G06F 3/0482 | 715/792 |
| 2014/0075332 A1 | 3/2014 | Jeon | | |
| 2014/0108979 A1* | 4/2014 | Davidson | G06F 3/0481 | 715/765 |
| 2014/0218298 A1* | 8/2014 | Law | G06F 3/0216 | 345/168 |
| 2014/0337786 A1* | 11/2014 | Luo | G06F 3/0416 | 715/773 |
| 2015/0035800 A1* | 2/2015 | Uchiyama | G06F 3/0421 | 345/175 |
| 2015/0074504 A1* | 3/2015 | Steinfl | G06F 3/0482 | 715/202 |
| 2015/0227236 A1* | 8/2015 | Lee | G06F 3/013 | 345/174 |
| 2015/0227308 A1* | 8/2015 | Kim | G06F 3/0486 | 715/769 |
| 2015/0370779 A1* | 12/2015 | Dixon | G06F 3/04842 | 715/261 |
| 2016/0062552 A1* | 3/2016 | Jeong | G06F 3/0488 | 715/788 |
| 2016/0062573 A1* | 3/2016 | Dascola | G06F 3/0482 | 715/810 |
| 2016/0062644 A1* | 3/2016 | Adams | G06F 3/04886 | 715/763 |
| 2016/0070407 A1* | 3/2016 | Jeon | G06F 1/1626 | 345/173 |
| 2016/0092047 A1* | 3/2016 | Yoon | G06F 3/0482 | 715/798 |
| 2016/0349970 A1* | 12/2016 | Everitt | G06F 40/166 | |
| 2016/0364138 A1* | 12/2016 | Luo | G06F 3/04886 | |

FOREIGN PATENT DOCUMENTS

| | | |
|---|---|---|
| WO | 2011/068299 A1 | 6/2011 |
| WO | 2014/061849 A1 | 4/2014 |

OTHER PUBLICATIONS

In view of Windows 8.1—Magnifying the screen available as of Jan. 16, 2014 on Abilitynet.org (Abilitynet). (Year: 2014).*

Adobe Acrobat 3D Version 8 Help manual, pp. 38-40 (Year: 2007).*

* cited by examiner

FIG. 3B

DISPLAY APPARATUS AND METHOD FOR DISPLAYING A SCREEN IN DISPLAY APPARATUS

CROSS-REFERENCE TO RELATED APPLICATION(S)

This application claims the benefit under 35 U.S.C. § 119(a) of a Korean patent application filed on Sep. 29, 2014 in the Korean Intellectual Property Office and assigned Serial number 10-2014-0130150, the entire disclosure of which is hereby incorporated by reference.

TECHNICAL FIELD

The present disclosure relates to a display apparatus and a method of displaying the same. More particularly, the present disclosure relates to a display apparatus and a method of displaying the same capable of processing information and intensively displaying the processed information in a specific area designated by a user.

BACKGROUND

Currently, with the development of the related technologies, a size of a screen of a display apparatus such as a tablet personal computer (PC) has been expanded. Various types of information are provided to a user while being disposed over the whole wide screen.

However, as the size of the screen increases, users having a narrow viewing angle such as a person with poor vision or an elderly person are likely to miss important information. Further, a user with hand dysfunction may have difficulty operating a display apparatus using a touch screen and therefore may avoid using a wide screen display apparatus.

Typically, a method of providing a user interface (UI) zooming in a screen to a point to which a user's gesture is input has been used. The method is based on the premise that the information on the whole screen may be primarily recognized, and therefore still has the problem as described above as it is.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

The present disclosure enables a user to display information at his/her preferred position and perform related tasks.

In accordance with an aspect of the present disclosure, a method of displaying a screen in a display apparatus is provided. The method includes setting an area of a display screen as a user designated area through an area designation user interface (UI), and when a preset event is generated, displaying at least one of a graphical user interface (GUI) and a portion of the display screen in the set user designated area, depending on the generated event type.

In accordance with another aspect of the present disclosure, a display apparatus is provided. The display apparatus includes a display, an input unit configured to receive a user command, and a controller configured to control the display to set an area of a display screen as a user designated area through an area designation UI, and, when a preset event is generated, display at least one of a GUI and a portion of the display screen in the set user designated area depending on the generated event type.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, 3C, 3D, and 3E are diagrams for describing setting a user designated area, according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first", "second", etc. may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

In an embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, various embodiments of the present disclosure will be described in detail with reference to the accompanying drawings.

Figure 1:
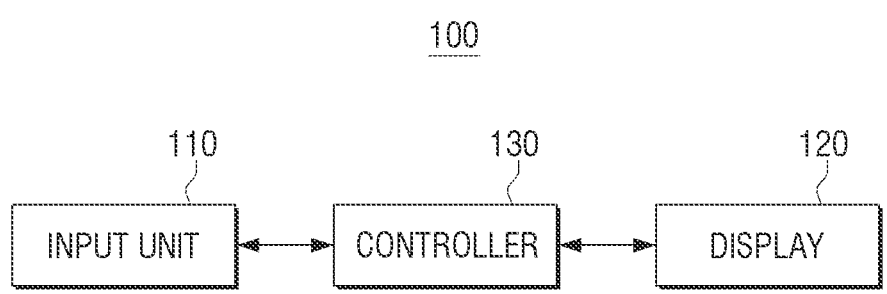
FIG. 1 is a schematic block diagram for describing a configuration of a display apparatus according to an embodiment of the present disclosure.

FIG. 1 is a diagram illustrating a configuration of a display apparatus 100 according to an embodiment of the present disclosure.

Referring to FIG. 1, a display apparatus 100 includes an input unit 110, a display 120, and a controller 130. The display apparatus 100 may be implemented in various forms such as a tablet personal computer (PC), a smart phone, and a smart television (TV).

The input unit 110 may serve to transmit and receive a command between the display apparatus 100 and a user. For example, the input unit 110 may correspond to a keypad, a touch screen, etc. According to an embodiment of the present disclosure, the input unit 110 may receive a user interaction which taps or drags a screen.

The display 120 displays a screen corresponding to the input image signal, etc. The display 120 displays at least one of a graphical user interface (GUI) and a portion of the display screen in a user designated area. The display 120 may be designed in various display panels. The display 120 may be implemented by various display technologies such as a liquid crystal display (LCD), an organic light-emitting diode (OLED), an e-paper, a plasma display panel (PDP), a vacuum fluorescent display (VFD), a field emission display (FED), an electro luminescence display (ELD), etc. The display panel is mainly an emission type, but a reflective display may be used. Further, the display 120 may also be implemented as a flexible display, a transparent display, etc.

The controller 130 controls the general components of the display apparatus 100. The controller 130 receives an area setting command through an area designation UI. The controller 130 sets an area of the display screen as the user designated area, corresponding to the input area setting command. When a preset event is generated, the controller 130 may control the display 120 to display at least one of the GUI and a portion of the display screen in the set user designated area, depending on the generated event type.

The controller 130 may set at least one of a position and a size of the user area using a grid and may set a method to sort at least one of the GUI and a portion of the display screen in the set user designated area. In this case, the area designation UI may be a UI including the grid on the display screen. According to the embodiment of the present disclosure, when a user command to set the size of the user designated area to be smaller than the preset minimum size is input to the input unit 110, the controller 130 provides feedback including a message that the a size of the user designated area may not be reduced. The feedback may be a visual feedback provided through the display 120 and may be an auditory feedback provided through an audio output unit 170.

When an event to which pop-up information is provided is generated, the controller 130 controls the display 120 to display a pop-up window including pop-up information in the set user designated area. When the size of the pop-up window is larger than that of the set user designated area, the controller 130 may re-size the pop-up window to display the pop-up window in the set user designated area. If an attribute of the pop-up window is set not to be re-sized, the controller 130 does not re-size the pop-up window but may also control the position of the pop-up window to position the pop-up window in the range of the user designated area on the horizontal axis of the screen.

When an event inputting the user interaction tapping the display screen to the input unit 110 is generated, the controller 130 may control the display 120 to display a portion of the display screen of a position where the user interaction is input in the user designated area. The controller 130 may control the display 120 to display a guide UI guiding an actual position and size of the screen displayed in the user designated area at the position where the user interaction is input. As another example, when an event inputting a user interaction making a drag in succession of the user interaction tapping the display screen to the input unit 110 occurs, the controller 130 may control the display 120 to display a portion of the display screen of a position where the user interaction changed by the user interaction making a drag is input in the user designated area. The controller 130 may control the display 120 to display a portion of the display screen appearing by the guide UI in the user designated area. For example, the guide UI may be a UI which temporarily represents an outline including the display screen having the same size as the user designated area around the position at which the user interaction is input.

When an event inputting a text is generated, the controller 130 may control the display 120 to display a main keypad. When one of a plurality of character keys included in the main keypad is touched, the controller 130 may control the display 120 to display a sub keypad classifying the plurality of character keys present in a column including the touched character key into a plurality of key groups in the user designated area. When one of the plurality of key groups is touched, the controller 130 may control the display 120 to display the plurality of character keys included in the touched key group. When one of the plurality of character keys is touched, the controller 130 may input the touched character key. As another example, when the user interaction tapping an area of the display screen other than the user designated area is input to the input unit 110 while the sub keypad is displayed, the controller 130 may remove the sub keypad. In addition, when text input text is completed, the controller 130 may control the display 120 to remove the sub keypad, to thereby again show the main keypad.

As described above, the display apparatus 100 displays information in the user designated area to enable a user having limited time or motion to more easily recognize and operate the information displayed on the whole display apparatus 100.

Figure 2:
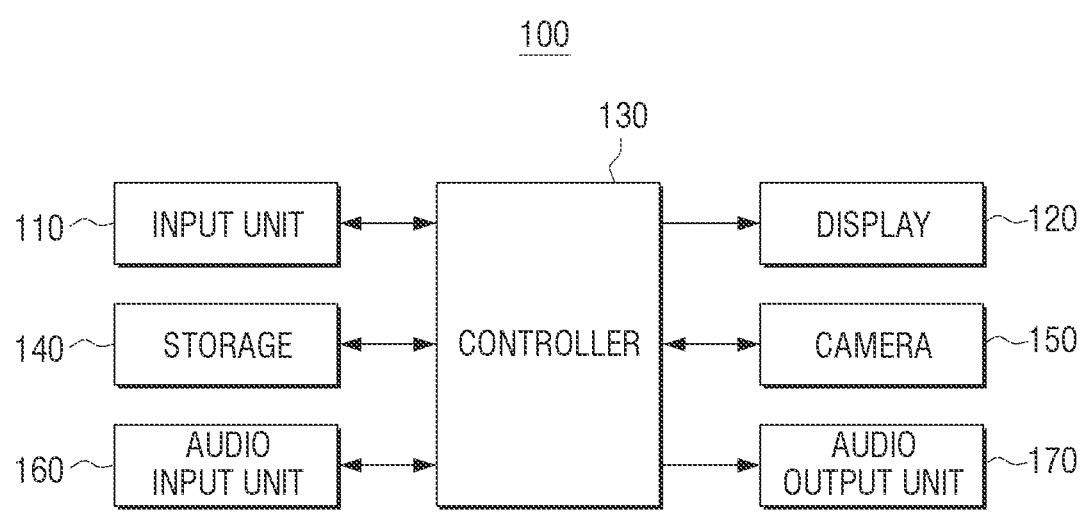
FIG. 2 is a detailed block diagram for describing a configuration of a display apparatus according to an embodiment of the present disclosure.

FIG. 2 is a block diagram illustrating in detail a configuration of a display apparatus according to an embodiment of the present disclosure.

Referring to FIG. 2, the display apparatus 100 includes the input unit 110, the display 120, a storage 140, a camera 150, an audio input unit 160, an audio input unit 170, and the controller 130.

The input unit 110 serves to receive a user command. The input unit 110 may receive an input pressing a button provided through the UI, and the user interaction using a touch screen such as a tap, a double tap, and a drag.

The display 120 displays a screen corresponding to image signals, which are input from various sources. The display 120 may display at least one of a GUI and a portion of the display screen in the user designated area. Further, the display 120 may display various UIs, a pop-up window, applications, widget, etc.

The storage 140 stores various programs, modules, and data that are required to operate the display apparatus 100. The storage 140 may include a random access memory (RAM) and a read-only memory (ROM).

The camera 150 may help applications providing a photograph shooting function and a moving picture shooting function to perform photographing. The camera 150 may also serve to recognize a user's motion, together with the input unit 110.

The audio input unit 160 serves to receive an audio signal. For example, when an audio signal corresponding to the preset audio signal is input through the audio input unit 160, the display apparatus 100 may perform a control to perform a specific function.

The audio output unit 170 outputs an audio signal generated from the audio processor (not illustrated). The audio output unit 170 may be integrated with or separated from the display apparatus 100, in which the separated audio output unit 170 is connected to the display apparatus 100 in a wired or wireless manner.

The controller 130 controls the input unit 110, the display 120, the storage 140, the camera 150, the audio input unit 160, and the audio output unit 170. The controller 130 may include a module for controlling the CPU and the display apparatus 100 and the ROM and the RAM which store data.

When an area setting command is input through the area designation UI, the controller 130 sets an area of the display screen as the user designated area, corresponding to the input area setting command. When the preset event is generated, the controller 130 may control the display 120 to display at least one of the GUI and a portion of the display screen in the user designated area set, depending on the generated event type.

The detailed operation of the controller 130 is described below with reference to FIGS. 3A to 18C.

The controller 130 controls the input unit 110 to receive the area setting command through the area designation UI and sets an area of the display screen as the user designated area, corresponding to the input area setting command. For example, the area designation UI may be the UI including the grid on the display screen. The controller 130 sets at least one of the position and the size of the user area using the grid and sets a method to sort the GUI, etc., in the set user designated area.

The UI including the grid divides a predetermined range of area into a cell unit and displays the predetermined range of area by disposing a cross shape on the display screen at a predetermined interval. The cell means a predetermined range of unit area which is divided by the grid. As another example, the UI including the grid may be implemented as a UI which divides the display screen into a predetermined unit area by a dotted line and displays the divided display screen.

FIGS. 3A to 3E are diagrams illustrating a method of receiving an area setting command in an area designation UI according to an embodiment of the present disclosure.

Figure 3A:
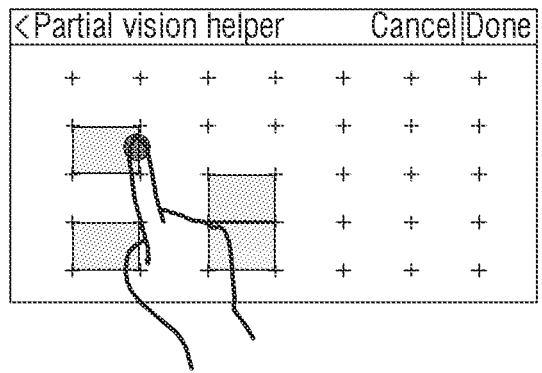

Referring to FIG. 3A, the area designation UI including the grid is provided. The controller 130 may control the input unit 110 to receive the area setting command by a scheme of tapping and selecting a desired cell in a grid. The controller 130 may control the display 120 to calculate a quadrangular area including all the cells selected by the input unit 110 based on the grid and display the calculated quadrangular area. The appearance in which the quadrangular area is calculated is illustrated in FIG. 3D. As illustrated in FIG. 3E, when a complete button is input through the input unit 110, the controller 130 sets the displayed quadrangular area as the user designated area.

Figure 3B:
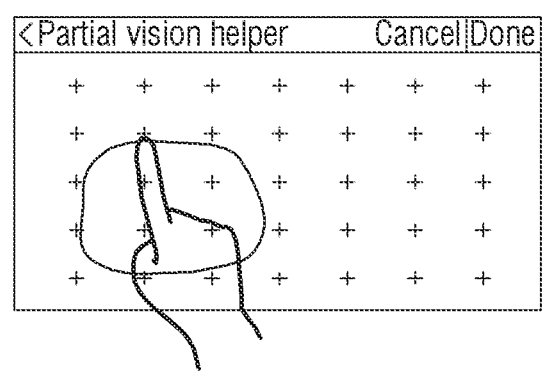

Referring to FIG. 3B, the controller 130 may control the input unit 110 to receive an input drawing the desired area. The controller 130 may control the display 120 to calculate the quadrangular area including all the area drawn by the input unit 110 based on the grid and display the calculated quadrangular area. The appearance in which the quadrangular area is calculated is illustrated in FIG. 3D. As illustrated in FIG. 3E, when a complete button is input through the input unit 110, the controller 130 sets the displayed quadrangular area as the user designated area.

Figure 3C:
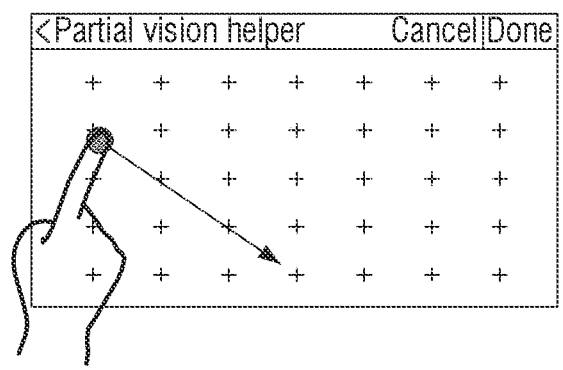
Figure 3D:
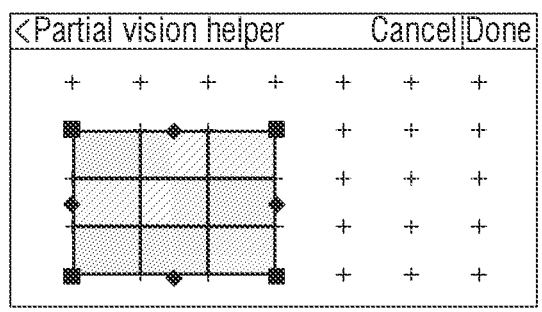
Figure 3E:
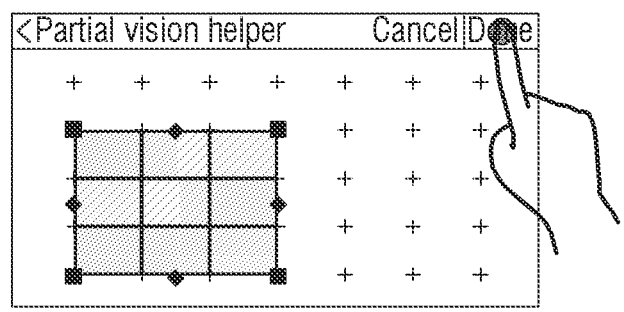

Referring to FIG. 3C, the controller 130 may control the input unit 110 to receive an input diagonally dragging a start and an end of the desired area. The controller 130 may control the display 120 to calculate the quadrangular area, adjusting the grid based on the dragged diagonal and display the calculated quadrangular area. The appearance in which the quadrangular area is calculated is illustrated in FIG. 3D. As illustrated in FIG. 3E, when a complete button is input through the input unit 110, the controller 130 sets the displayed quadrangular area as the user designated area.

Figure 4:
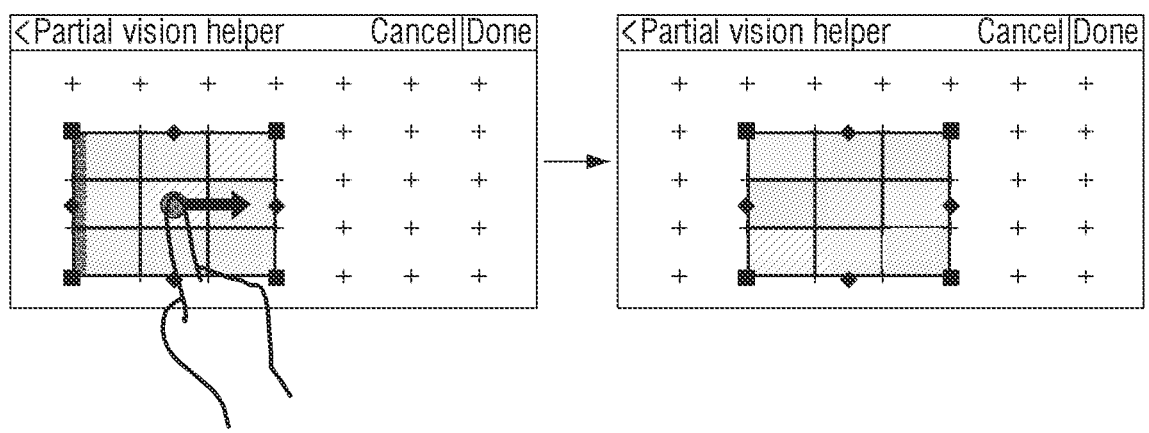
FIG. 4 is a diagram for describing changing a position of a user designated area, according to an embodiment of the present disclosure.

FIG. 4 is a diagram for describing changing a position of a user designated area according to an embodiment of the present disclosure. The controller 130 may change the position of the set user designated area.

Referring to FIG. 4, when the user input dragging the user designated area while holding the inside of the user designated area set in the quadrangle is input through the input unit 110, the controller 130 may change the position of the user designated area to the input drag direction based on the grid. For example, when the position where the dragging in the right direction ends is the right based on an intermediate point of a cell, the controller 130 may move the user designated area to the position including the corresponding cell. When the drag ends at the left based on the intermediate point of the cell, the controller 130 may move the user designated area to the position including only the left cell of the corresponding cell.

The controller 130 may change the size of the set user designated area. However, the controller 130 may set the minimum size of the user setting area in advance. The minimum size of the user setting area may be determined in consideration of the size of the user designated area required to transfer at least information depending on the situations. If the user command to set the size of the user designated area to be smaller than the preset minimum size is input to the input unit 110, the controller 130 provides feedback including a message that the a size of the user designated area may not be reduced. The controller 130 may provide various types of feedback, such as visual feedback and auditory feedback. For example, the controller 130 may control the display 120 to provide a shaded visual effect to a corner portion of the user designated area. As another example, the controller 130 may control the display 120 to display a pop-up window including a message "a size of the designated area may not be set to be smaller than 3×2". As another example, the controller 130 may control the audio output unit 170 to output an audio message "a size of the designated area may not be set to be smaller than 3×2".

Figure 5:
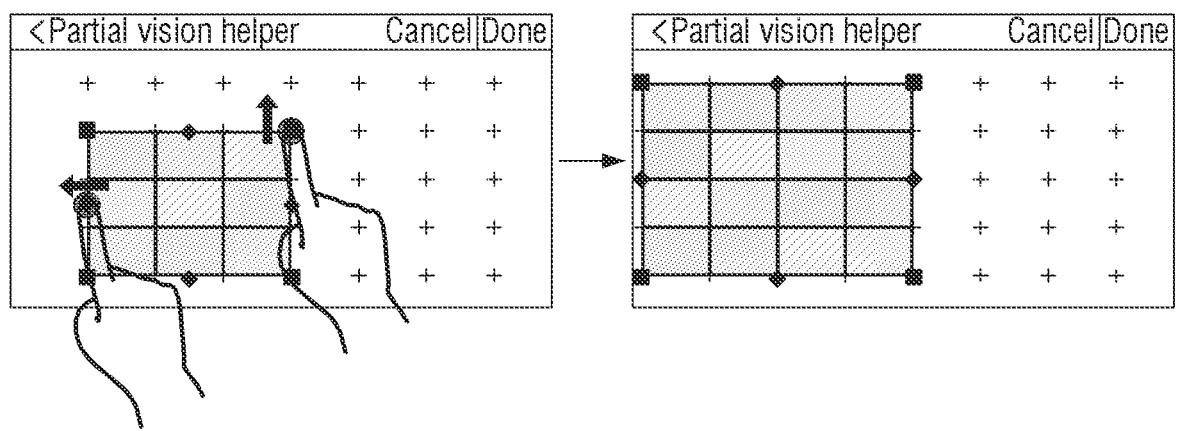
FIG. 5 is a diagram for describing changing a size of a user designated area, according to an embodiment of the present disclosure.

FIG. 5 is a diagram for describing changing a size of a user designated area, according to an embodiment of the present disclosure.

Referring to FIG. 5, the controller 130 may extend the size of the set user designated area. For example, the controller 130 may control the display 120 to display a small icon at the corner of the set user designated area. If the input unit 110 receives the user interaction dragging the small icon disposed at the corner, the controller 130 may move the corner of the user designated area in the dragged direction to change the size of the user designated area. As another example, the controller 130 may change the size of the user designated area, corresponding to the user interaction pinching/un-pinching inside the user designated area. As another example, the controller 130 may change the size of the user designated area, corresponding to the user interaction rotating in the left/right direction in the user designated area.

Figure 6:
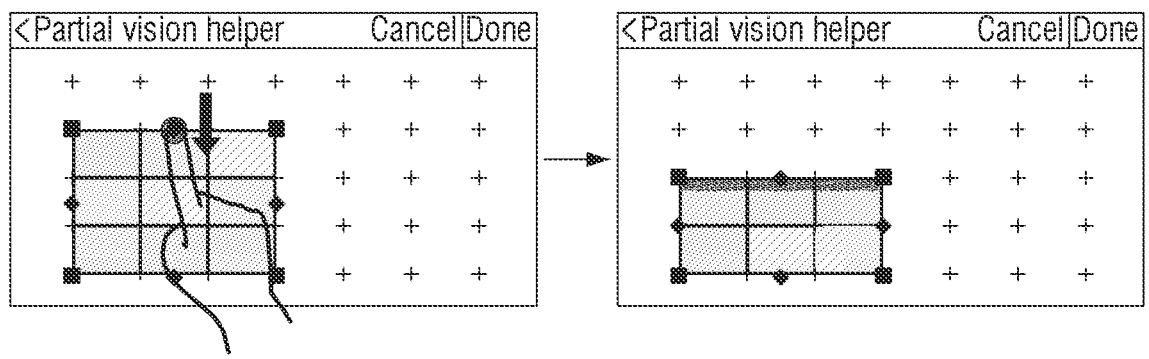
FIG. 6 is a diagram for describing a feedback provided when a user designated area is set to be smaller than a preset minimum size, according to an embodiment of the present disclosure.

FIG. 6 is a diagram for describing an example of feedback provided at a time of changing a size of a user designated area to a preset minimum size or less according to an embodiment of the present disclosure.

Referring to FIG. 6, the controller 130 may set a 3×2 size to the minimum size of the user designated area. If the user interaction reducing the size of the user designated area is input to the input unit 110, the controller 130 reduces the size of the user designated area. However, when the user interaction changing the size of the set user designated area to be smaller than the minimum size is input to the input unit 110, the controller 130 may control the display 120 to display the visual feedback that the size may be no longer reduced. As another example, the controller 130 may control the audio output unit 170 to output the audio message that the size may not be changed smaller than the preset minimum size.

Figure 7:
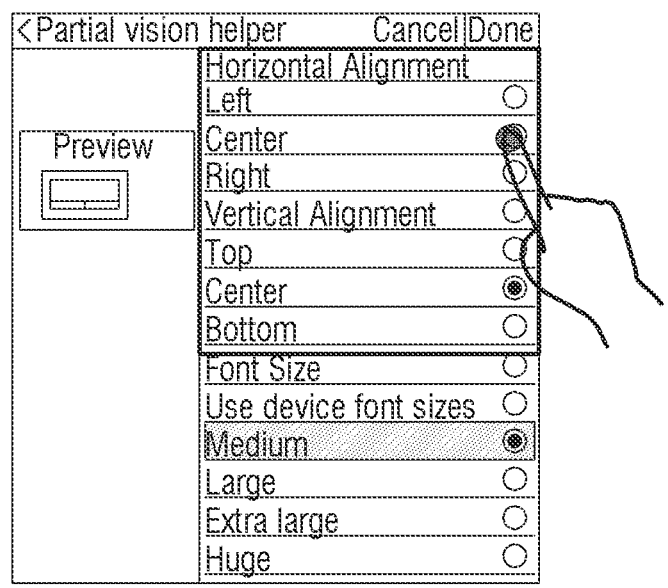
FIG. 7 is a diagram for describing setting a sorting method for a graphical user interface (GUI), in a user designated area, according to an embodiment of the present disclosure.

FIG. 7 is a diagram for describing setting a sorting method for a GUI, in a user designated area, according to an embodiment of the present disclosure.

Referring to FIG. 7, after the position and the size of the user area are set, the controller 130 may set the method of sorting the GUI to be displayed in the user designated area. For example, as illustrated in FIG. 7, the controller 130 may control the display 120 to display the UI setting the sorting method of the screen in the user designated area and a size of a font. When the user command to select the sorting method or the size of the font using the displayed UI is input through the input unit 110, the controller 130 may control the display 120 to display the GUI, etc., in the user designated area depending on the selected sorting method or the selected size of the font.

Figure 8:
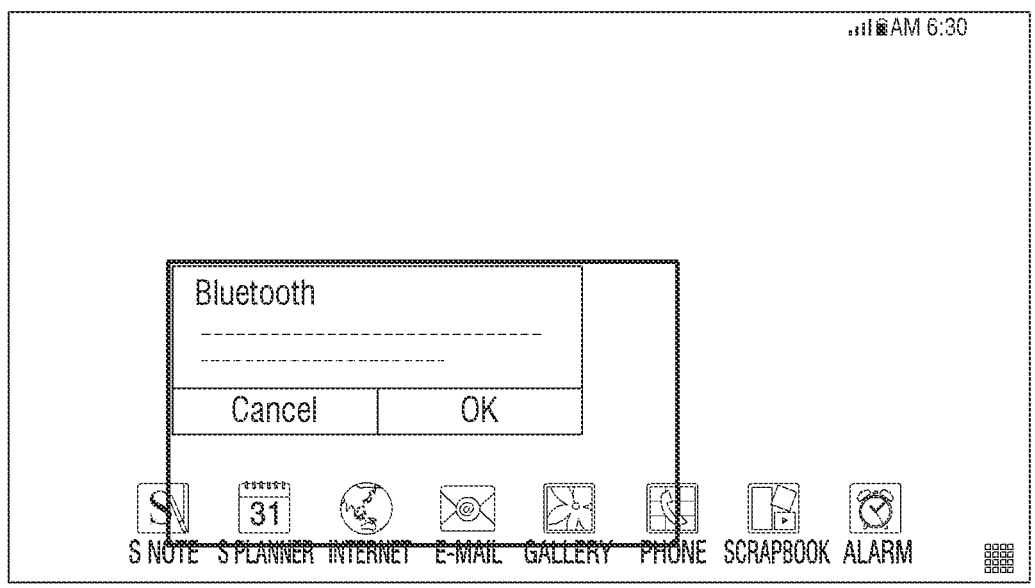
FIG. 8 is a diagram illustrating that a pop-up window is displayed in a user designated area, according to an embodiment of the present disclosure.

FIG. 8 is a diagram illustrating that a pop-up window is displayed in a user designated area, according to an embodiment of the present disclosure.

Referring to FIG. 8, when the event to which the pop-up information is provided is generated, the controller 130 controls the display 120 to display the pop-up window including the pop-up information in the set user designated area. For example, as illustrated in FIG. 8, when the event popping-up the window including pop-up information on the entry into a Bluetooth communication mode is generated, the controller 130 may control the display 120 to display the pop-up window in the set user designated area. Even though the pop-up window is generated at another position of the display screen, the controller 130 may control the display 120 to display the generated pop-up window in the user designated area fixed at an area of the whole display screen. In FIG. 8, the controller 130 controls the display 120 to display the pop-up window according to the preset sorting method to sort the pop-up window at an upper left.

Figure 9A:
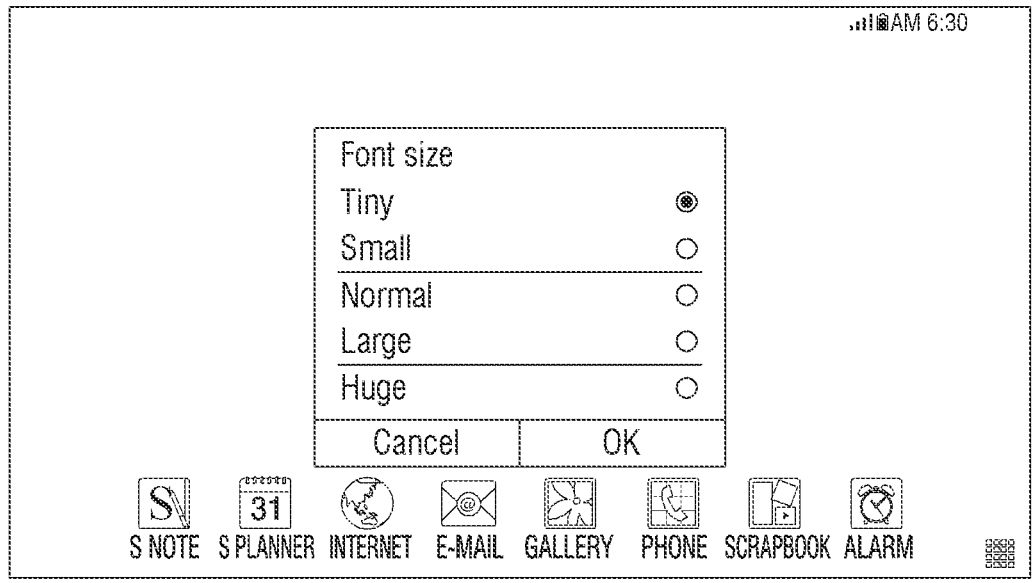
FIGS. 9A, 9B, and 9C are diagrams for describing changing a size of a pop-up window such as re-sizing, according to various embodiments of the present disclosure.
Figure 9A:
Figure 9A:
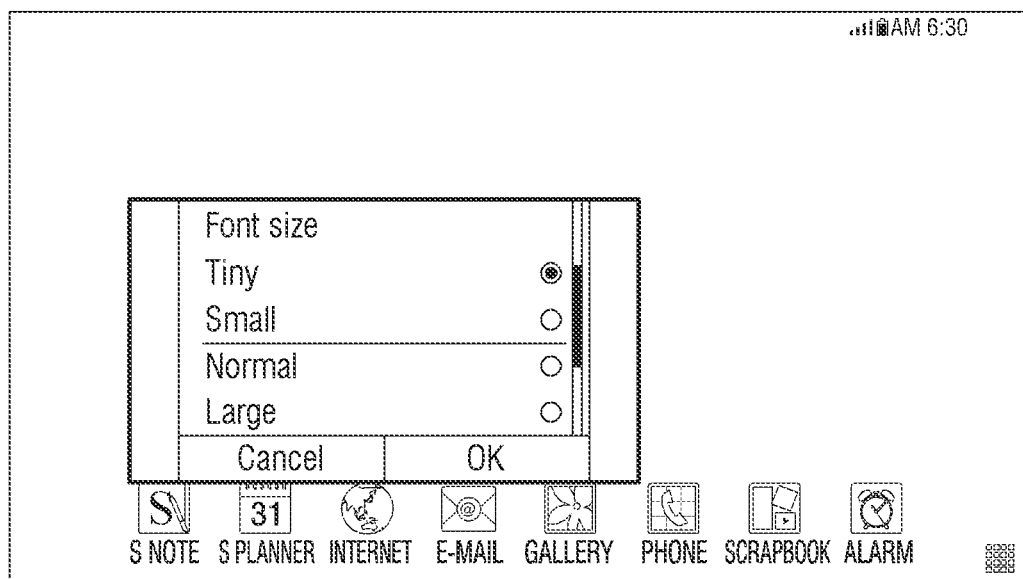
Figure 9B:
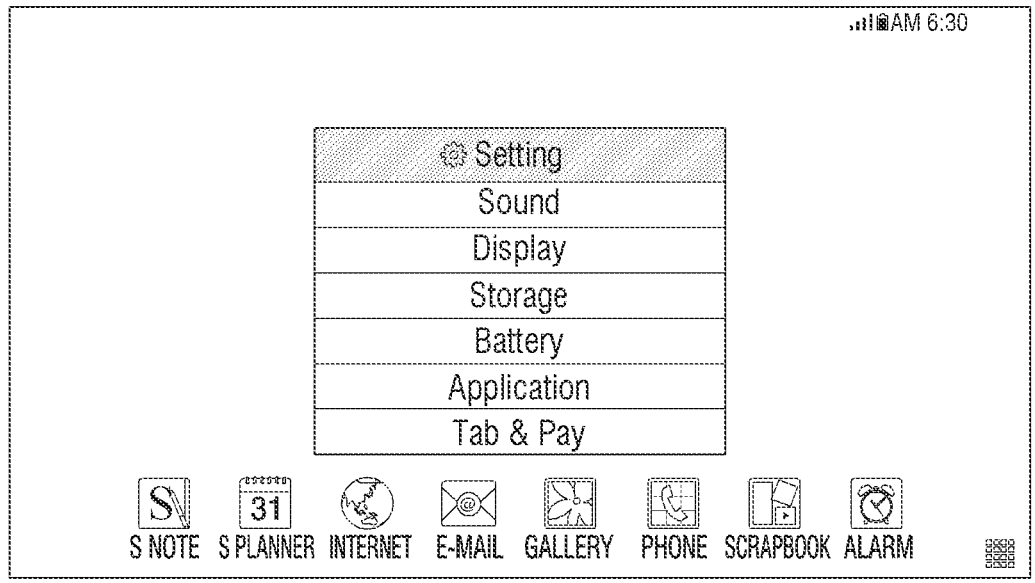
Figure 9B:
Figure 9B:
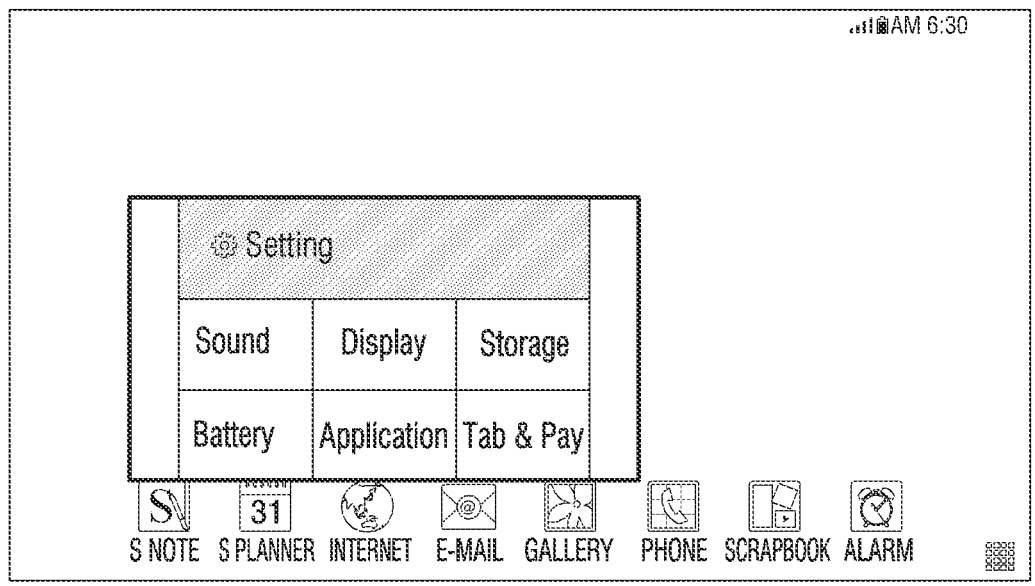
Figure 9C:
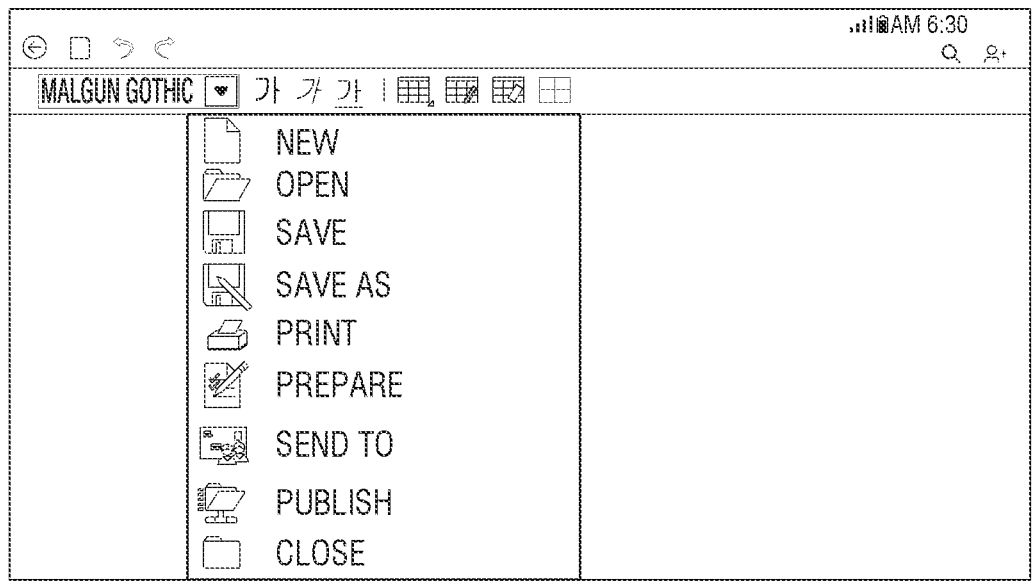
Figure 9C:
Figure 9C:
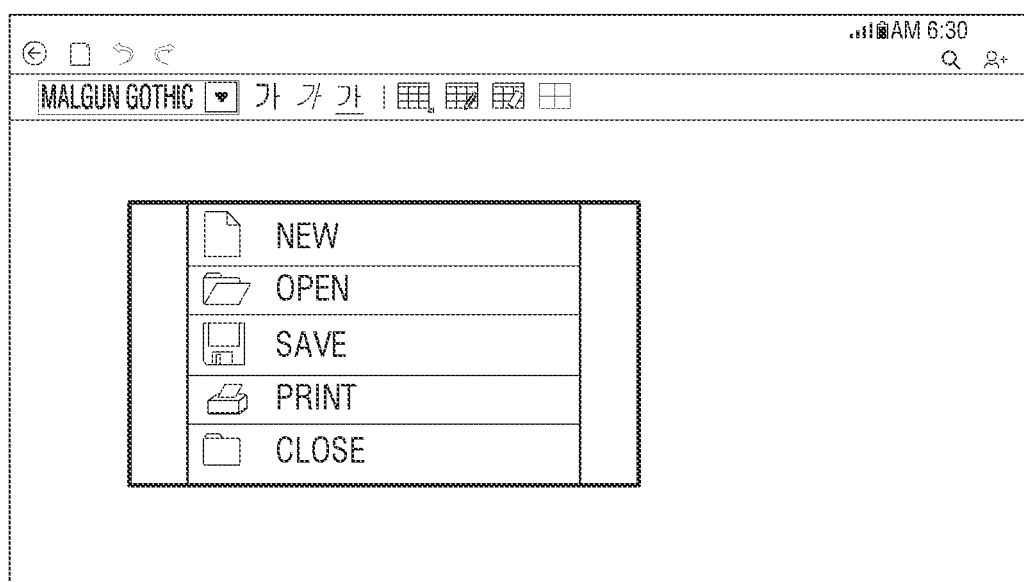

FIGS. 9A to 9C are diagrams for describing changing a size of a pop-up window such as re-sizing, according to various embodiments of the present disclosure.

Referring to FIGS. 9A-9C, when the size of the pop-up window is larger than the size of the set user designated area, the controller 130 may re-size the pop-up window to be displayed in the set user designated area. Referring to FIG. 9A, it may be confirmed that the pop-up window deviates from the user designated area in a vertical direction. For example, the controller 130 may re-size the pop-up window by generating a scroll bar on the pop-up window to make a vertical length of the pop-up window be equal to that of the user designated area. The reason for adopting a method of generating a scroll bar instead of a method of reducing a pop-up window is that the information provided from the pop-up window may be damaged due to the reduction in the pop-up window. In another example, when there is no damage risk of information even though the pop-up window is reduced, the controller 130 may control the display 120 to reduce the pop-up window to be displayed in the user designated area.

The controller 130 may change an arrangement of buttons configuring the pop-up window to change a pop-up window layout. Referring to FIG. 9B, it may be confirmed that the size of the setting menu pop-up window deviates from the user designated area in a vertical direction. For example, the controller 130 may change buttons arranged in a 6×1 form to a 2×3 form. By changing the arrangement of the buttons, the controller 130 may control the display 120 to display all the buttons of the pop-up window in the user designated area.

Referring to FIG. 9C, the controller 130 may reduce the size of the pop-up window by deleting additional buttons other than the buttons corresponding to main functions among the plurality of buttons configuring the pop-up window. The pop-up window is configured of buttons corresponding to main functions such as 'new', 'open', 'save', 'print', and 'close', and buttons corresponding to additional functions such as 'save as', 'prepare', 'send to', and 'publish'. To display the pop-up window in the user designated area, the controller 130 may delete the additional buttons to display only buttons corresponding to the main functions. As another example, the controller 130 may control the display 120 to generate a button switching a screen to a screen including the buttons corresponding to the additional functions instead of deleting the buttons corresponding to the additional functions and display the newly generated buttons along with the buttons corresponding to the main functions. Further, if the size of the pop-up window is larger than that of the user designated area even when the additional buttons are deleted, the controller 130 may also apply the method of additionally generating a scroll bar.

Figure 10:
FIG. 10 is a diagram for describing a disposition of a pop-up window when the pop-up window is not re-sized, according to an embodiment of the present disclosure.

FIG. 10 is a diagram for describing a disposition of a pop-up window when the pop-up window is not re-sized, according to an embodiment of the present disclosure.

Referring to FIG. 10, when the re-sizing cannot be made due to the setting state of the pop-up window, the controller 130 may apply the sorting state of the user designated area only to the horizontal position of the pop-up window. For example, FIG. 10 illustrates the pop-up window in the case in which the vertical length of the pop-up window is longer than that of the user designated area and the horizontal length of the pop-up window is shorter than that of the user designated area. The controller 130 does not re-size the pop-up window and may apply the sorting setting of the user designated area only to the horizontal position. In FIG. 10, the pop-up window is set to be sorted in the middle in the horizontal direction. Therefore, the controller 130 may control the display 120 to display the pop-up window at the position where the pop-up window is sorted in the middle in the horizontal direction. As another example, if the pop-up window is displayed in the preset horizontal sorting method, when the pop-up window deviates from the whole display screen, the controller 130 may control the display 120 to automatically display the pop-up window, adjusting an edge portion of the whole adjacent display screen.

Figure 11A:
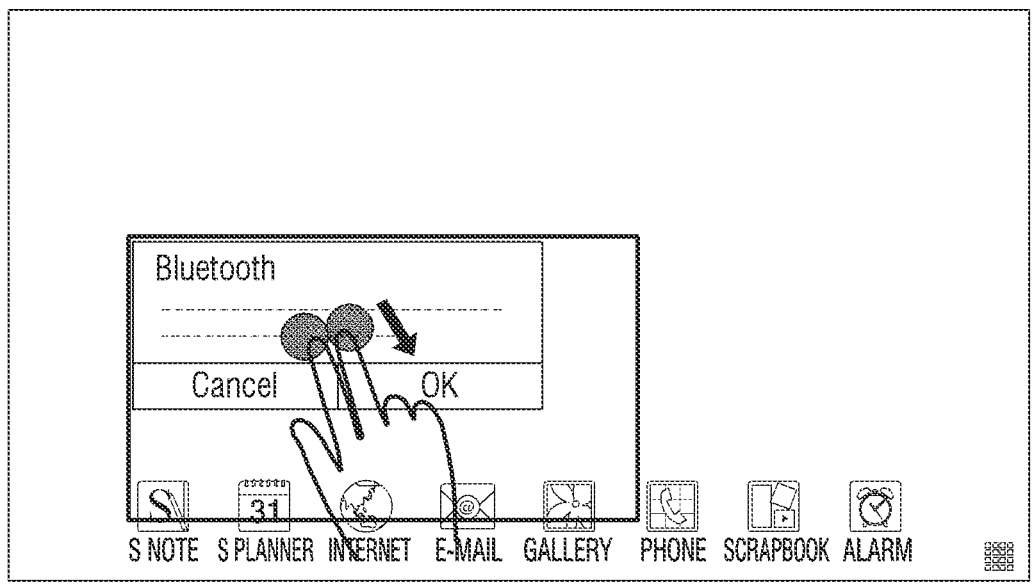
FIGS. 11A and 11B are diagrams for describing changing a position or a size of a pop-up window, according to an embodiment of the present disclosure.
Figure 11B:
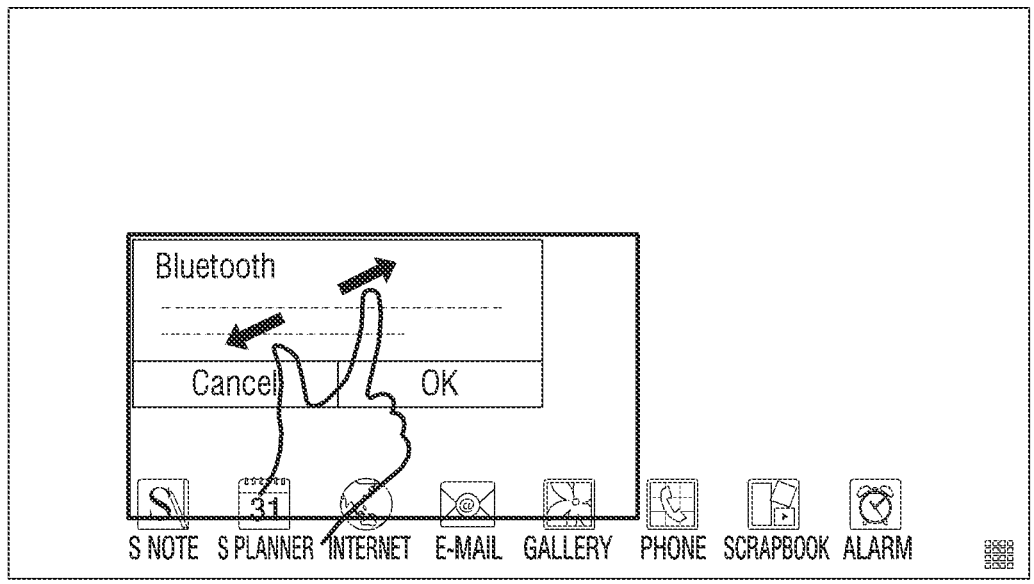

FIGS. 11A and 11B are diagrams for describing changing a position or a size of a pop-up window, according to an embodiment of the present disclosure.

Referring to FIGS. 11A and 11B, the controller 130 may control the display 120 to display the pop-up window by moving the position of the pop-up window corresponding to the user interaction input trough the input unit 110 or zooming in/out the size of the pop-up window. Referring to FIG. 11A, when the user interaction dragging the pop-up window is input to the input unit 110, the controller 130 may control the display 120 to display the pop-up window while moving the pop-up window in the dragged direction. For example, after the pop-up window moves, if the user interaction making the double tap is input, the controller 130 may return the position of the pop-up window to the original position.

Referring to FIG. 11B, when the user interaction pinching the pop-up window is input to the input unit 110, the controller 130 may control the display 120 to display the pop-up window while zooming in the pop-up window. When the user interaction making the un-pinch is input, the controller 130 may zoom out the pop-up window. After the pop-up window is zoomed in/out, if the user interaction making the double tap is input, the controller 130 may return the size of the pop-up window to the original size. The user interactions such as the drag, the double tap, the pinch, and the un-pinch as described above and the functions such as the movement, the return, the zoom in, and the zoom out as described above are not fixedly mapped, and therefore the controller 130 may perform an operation of controlling the display 120 to move the position of the pop-up window using various kinds of user interactions and display the moved pop-up window, etc.

According to the embodiment of the present disclosure, the controller 130 controls the display 120 to display a portion of the display screen of the position where the user interaction is input to the user designated area when the event inputting the user interaction tapping the display screen to the input unit 110 is generated and controls the display 120 to display the guide UI guiding the actual position and size of the screen displayed in the user designated area at the position where the user interaction is input.

The guide UI is an UI guiding the screen displayed in the user designated area to display the screen of the area of which position and size of the whole display screen. For example, the guide UI may be a box-shaped UI of which the outline is a dotted line. The controller 130 provides the information on which portion of the whole display screen the screen displayed in the user designated area represents, based on the position where the box is disposed and the size of the box.

Figure 12:
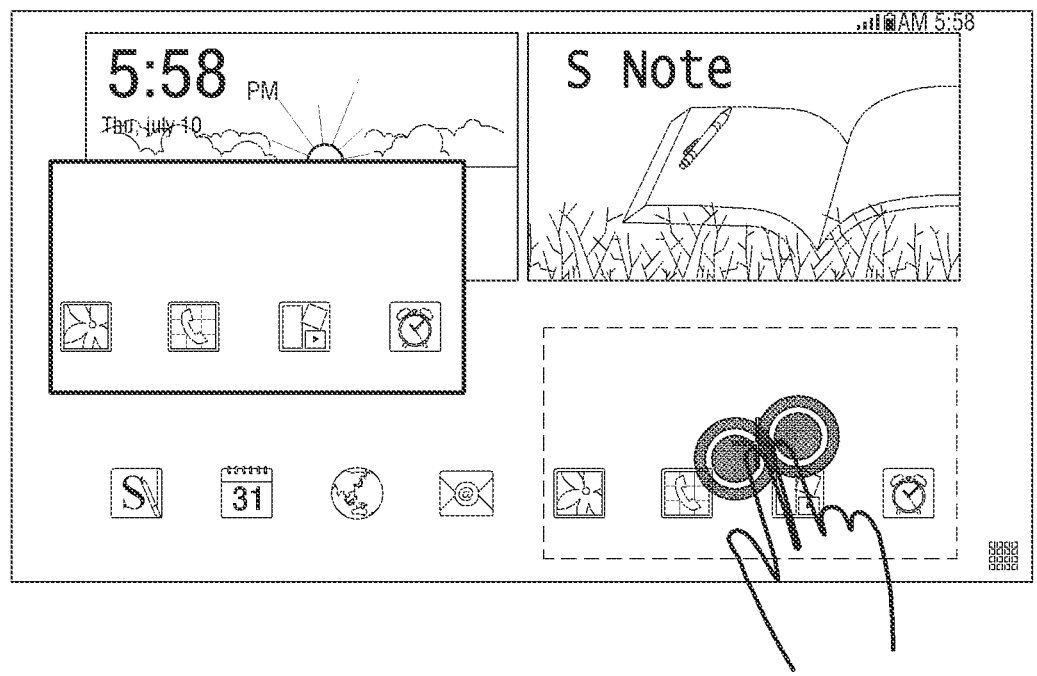
FIG. 12 is a diagram illustrating that a portion of a whole display screen is displayed in a user designated area, according to an embodiment of the present disclosure.

FIG. 12 is a diagram illustrating an example in which a portion of a whole display screen is displayed in a user designated area according to an embodiment of the present disclosure.

Referring to FIG. 12, when the user interaction tapping the whole display screen is input to the input unit 110, the controller 130 may control the display 120 to display a portion of the display screen of the position at which the user interaction is input in the user designated area. The controller 130 may display a portion of the whole display screen having the same size as the user designated area based on the position where the user interaction is input. Further, the controller 130 may control the display 120 to display the guide UI at the position where the user interaction is input. For example, the controller 130 may set the size of the guide UI to be equal to that of the set user designated area and may control the display 120 to display the outline only while the user interaction is maintained. The user may easily recognize the actual position and size of the screen displayed in the user designated area through the guide UI.

As another embodiment of the present disclosure, when the event inputting the user interaction making the drag in succession of the user interaction tapping the display screen to the input unit 110 is generated, the controller 130 may control the display 120 to display an area of the display screen of a position at which the user interaction changed by the user interaction making the drag is input in the user designated area.

FIGS. 13A to 13D are diagrams for describing a case in which a user interaction making the drag is input according to an embodiment of the present disclosure.

Figure 13A:
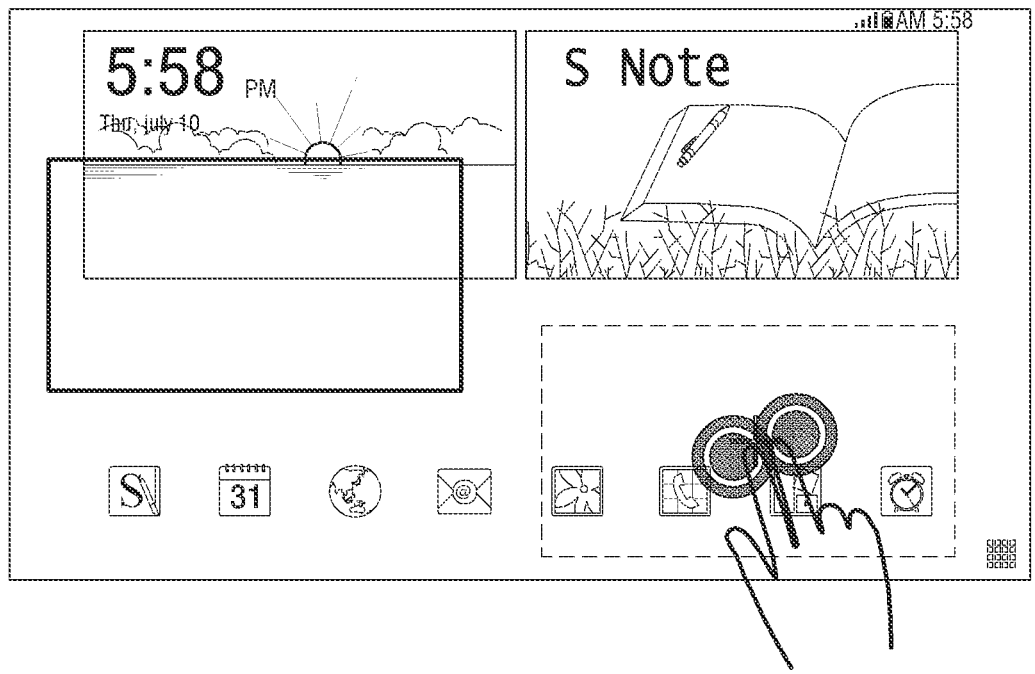
FIGS. 13A, 13B, 13C, and 13D are diagrams for describing a case in which a user interaction making a drag is input, according to an embodiment of the present disclosure.
Figure 13B:
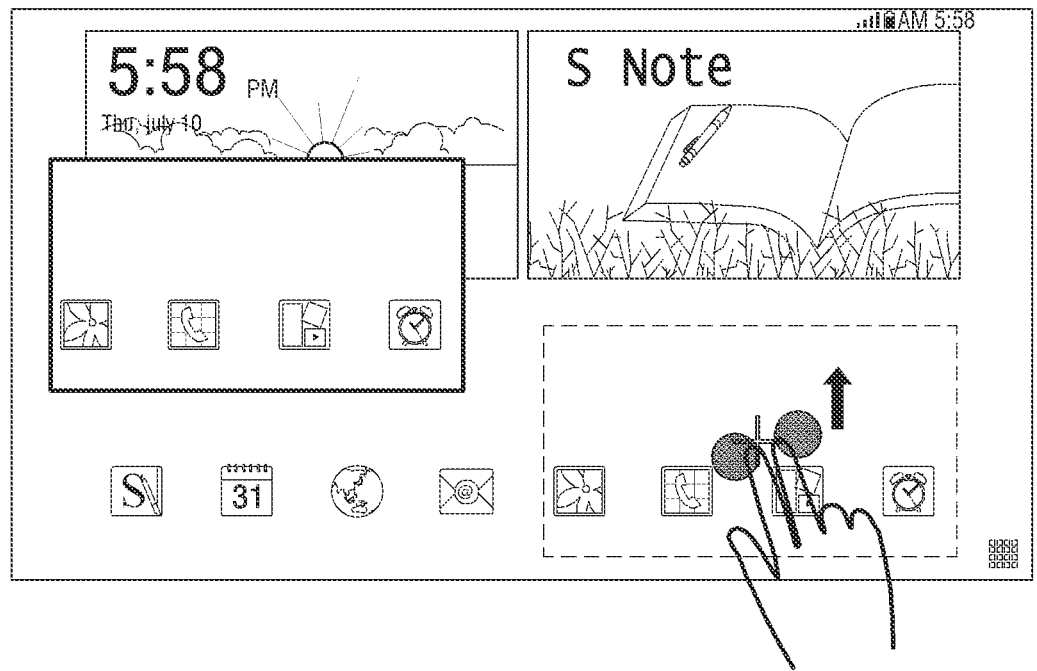

Referring to FIG. 13A, when the user interaction tapping the whole display screen is input, the controller 130 controls the display 120 to display the screen of the portion to which the user interaction is input in the user designated area. The controller 130 controls the display 120 to display the guide UI on the screen of the portion to which the user interaction is input. In FIG. 13B, it may be confirmed that the screen of the corresponding portion is displayed in the user designated area. Further, the user interaction making the drag in succession of the user interaction tapping the display screen is input, the controller 130 changes the screen portion selected from the whole display screen depending on the drag direction. The controller 130 may control the display 120 to display the changed position of the guide UI, corresponding to the change in the input position of the user interaction.

Figure 13C:
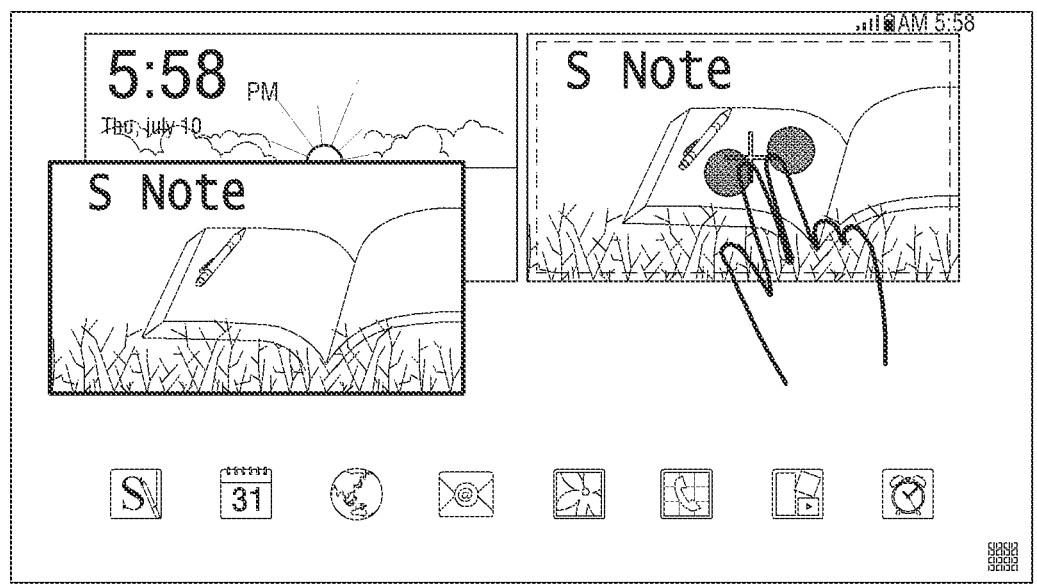
Figure 13D:
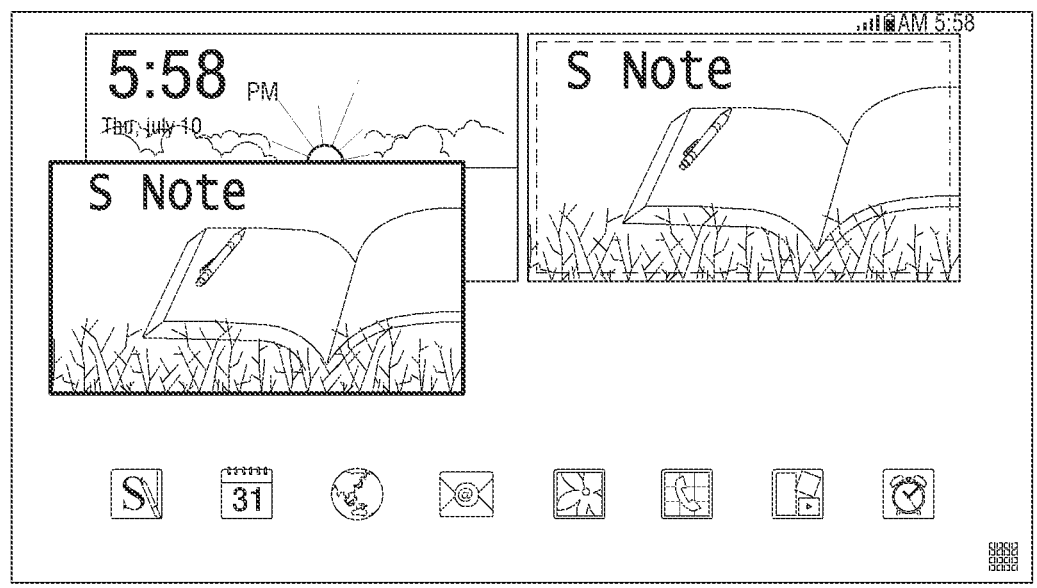

Referring to FIG. 13C, when the user interaction making the drag ends, the controller 130 may control the display 120 to display the screen of the portion where the moving guide UI appears in the user designated area. Finally, in FIG. 13D, when the user's finger takes away the screen to end the user interaction, the controller 130 may control the display 120 to display the screen of the portion where the guide UI is finally positioned in the user designated area and make the guide UI disappear.

The guide UI guides the actual position and size of the screen displayed in the user designated area. For example, the controller 130 may control the display 120 to display the guide UI only while the user interaction is input.

Figure 14A:
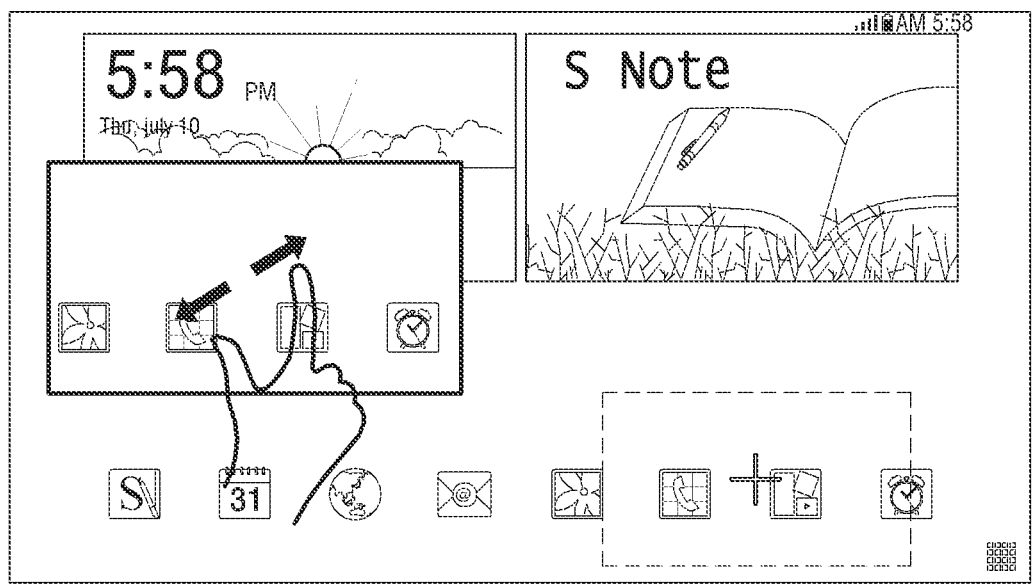
FIGS. 14A and 14B are diagrams for describing changing a size of a guide user interface (UI) in response to zooming in/out of a screen displayed in a user designated area, according to an embodiment of the present disclosure.
Figure 14B:
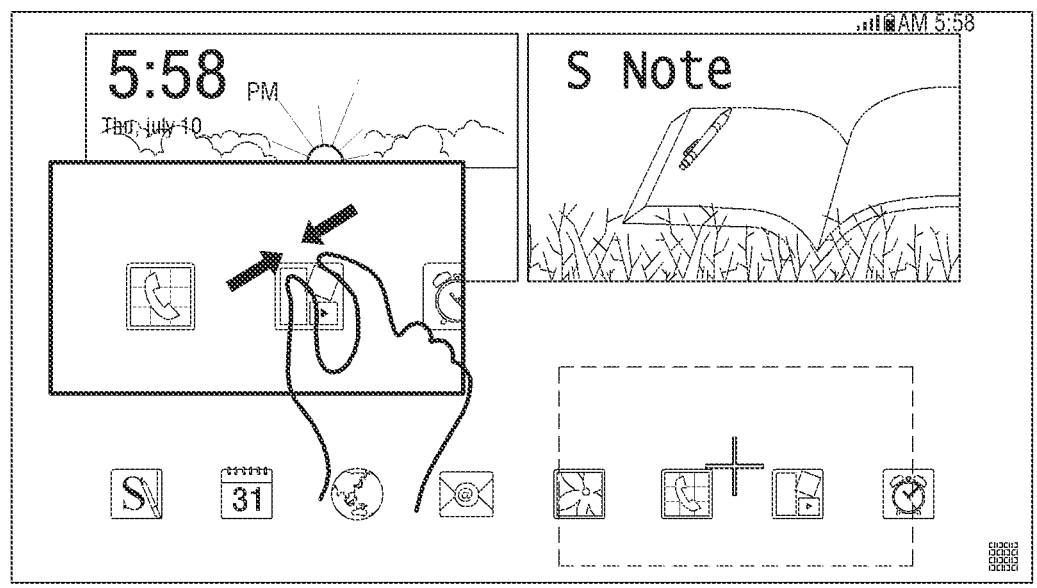

FIGS. 14A and 14B are diagrams illustrating an example in which a size of a guide UI guiding an actual position and size of a screen is changed corresponding to the zooming in/out of the screen displayed in a user designated area according to an embodiment of the present disclosure.

Referring to FIG. 14A, when the user interaction making the un-pinch within the user designated area is input, the controller 130 controls the display 120 to display the screen displayed in the user designated area while zooming in the screen. Zooming in the screen of the user designated area means zooming out the size of the screen corresponding to the user designated area in the whole display screen. The controller 130 zooms out the size of the guide UI, corresponding to zooming out the screen displayed in the user designated area.

Referring to FIG. 14B, when the user interaction making the pinch within the user designated area is input, the controller 130 controls the display 120 to display the screen displayed in the user designated area while zooming out the screen. The controller 130 zooms in the size of the guide UI, corresponding to zooming out the screen displayed in the user designated area.

According to an embodiment of the present disclosure, the controller 130 may temporarily zoom in the scroll range in the user designated area. By adjusting a start point and an end point scrolled in the display screen to the user designated area, the controller 130 may draw the first item and the final item of the list to an edge of the user designated area to set the first item and the final item so as to confirm the corresponding content. For example, the position of the first item or the final item in the screen scroll is fixed to a left/right end of the screen and thus the first item or the final item may no longer move. Therefore, there is a problem in that the user having the limited viewing angle may not confirm an item of the end of the scroll. The controller 130 draws the item of the end of the scroll to the user designated area to display the item, thereby solving the problem.

Figure 15A:
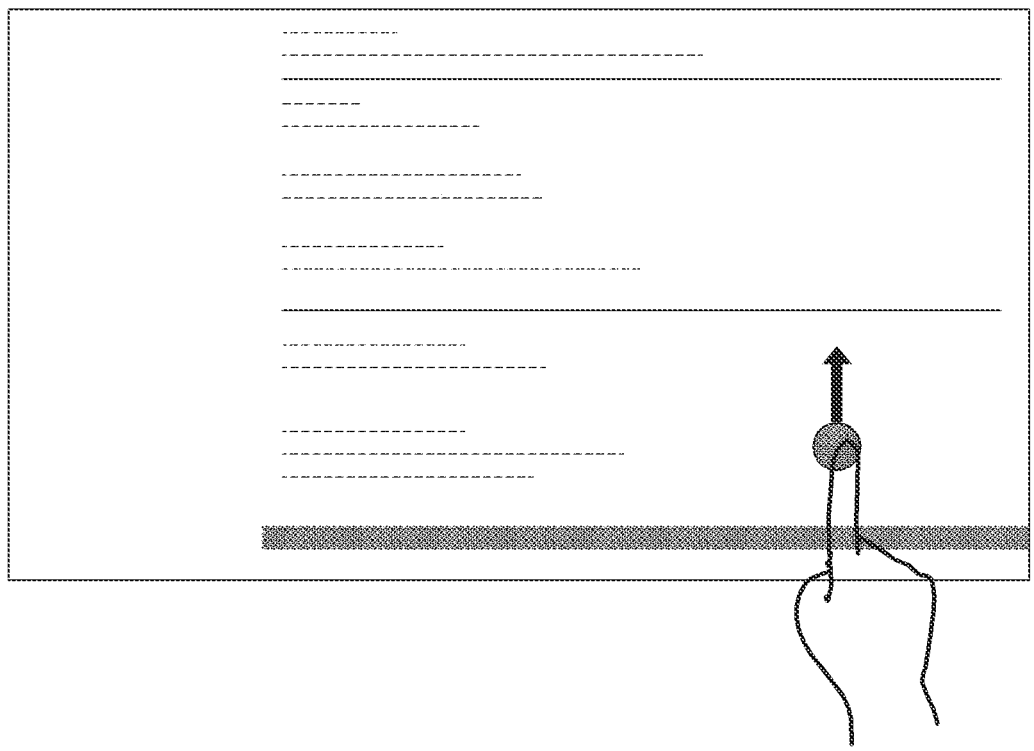
FIGS. 15A and 15B are diagrams for describing a temporary extension of a scroll range, according to an embodiment of the present disclosure.
Figure 15B:
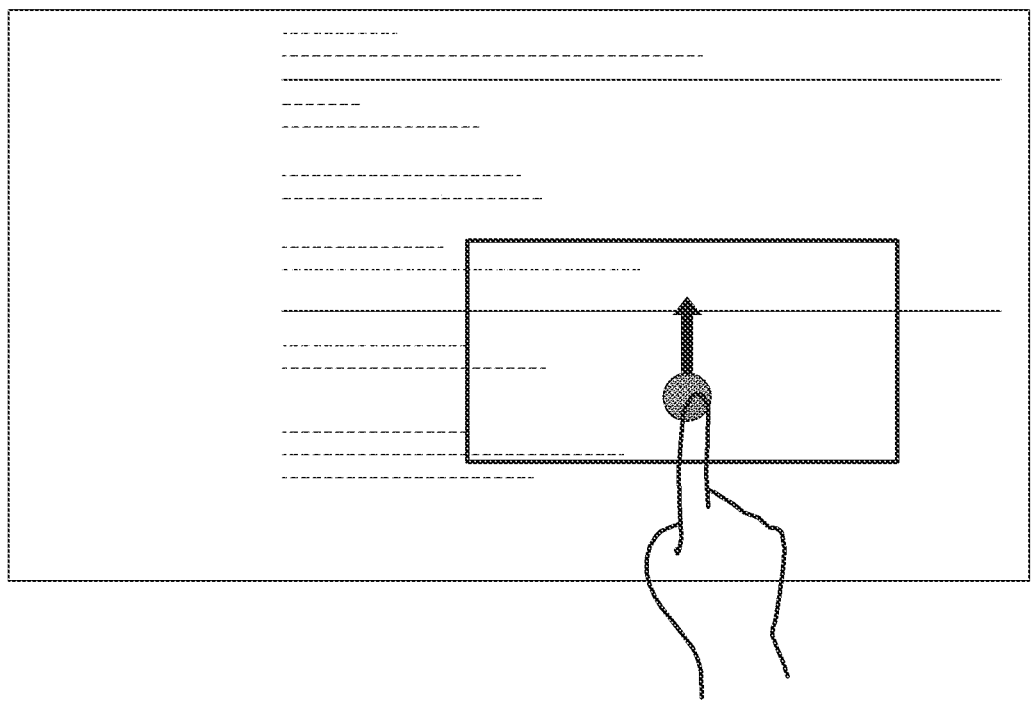

FIGS. 15A and 15B are diagrams for describing a temporary extension of a scroll range according to an embodiment of the present disclosure.

Referring to FIG. 15A, a lower end of the list is fixed even though there is the user command scrolling the screen upward, and thus it may be confirmed that the display screen is no longer scrolled. However, as illustrated in FIG. 15B, when the user designated area is activated, if the user command scrolling the screen upward is input, the controller 130 may control the display 120 to display a lowermost item of the list in the user designated area. Therefore, even in the user having the narrow viewing angle, the user designated area is set at the portion at which the viewing angle arrives, and as a result the user may recognize the information displayed only at corners of the whole display screen.

According to the embodiment of the present disclosure, when an event inputting a text is generated, the controller 130 may control the display 120 to display a main keypad, when one of a plurality of character keys included in the main keypad is touched, the controller 130 may control the display 120 to display a sub keypad classifying the plurality of character keys present in a column including the touched character key into a plurality of key groups in the user designated area. When one of the plurality of key groups is touched, the controller 130 may control the display 120 to display the plurality of character keys included in the touched key group. When one of the plurality of character keys is touched, the controller 130 may input the touched character key.

Figure 16A:
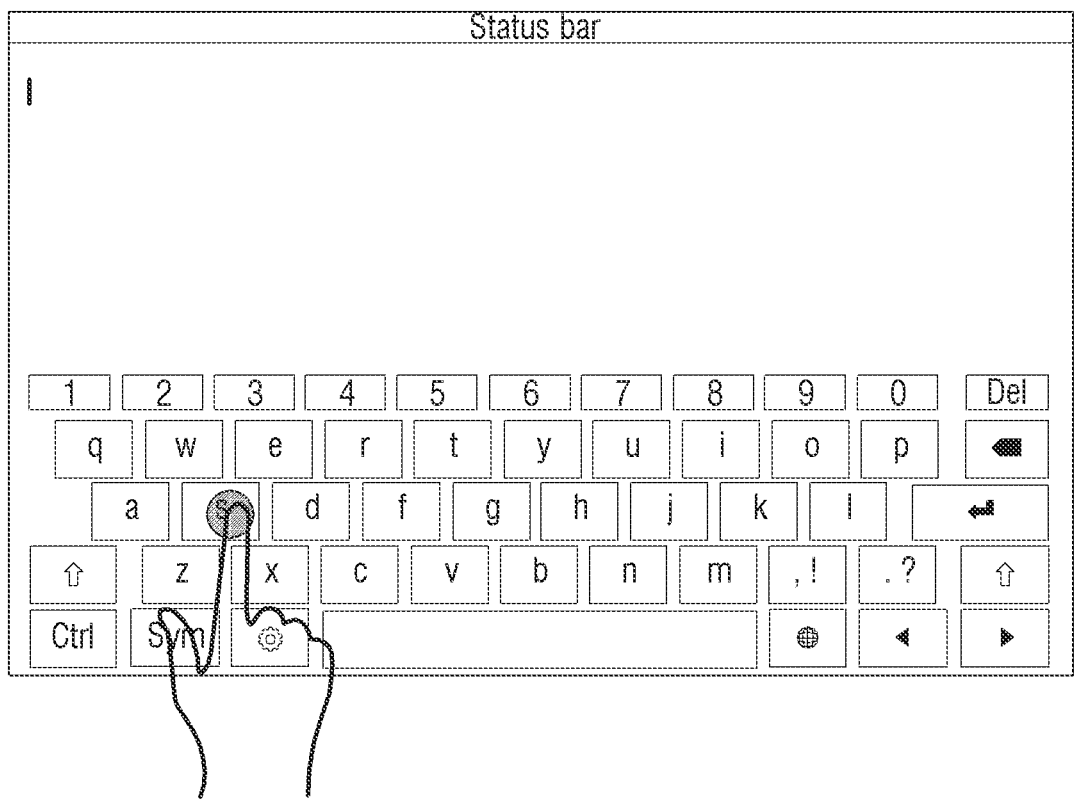
FIGS. 16A, 16B, and 16C are diagrams for describing inputting a text using a sub keypad, according to an embodiment of the present disclosure.
Figure 16B:
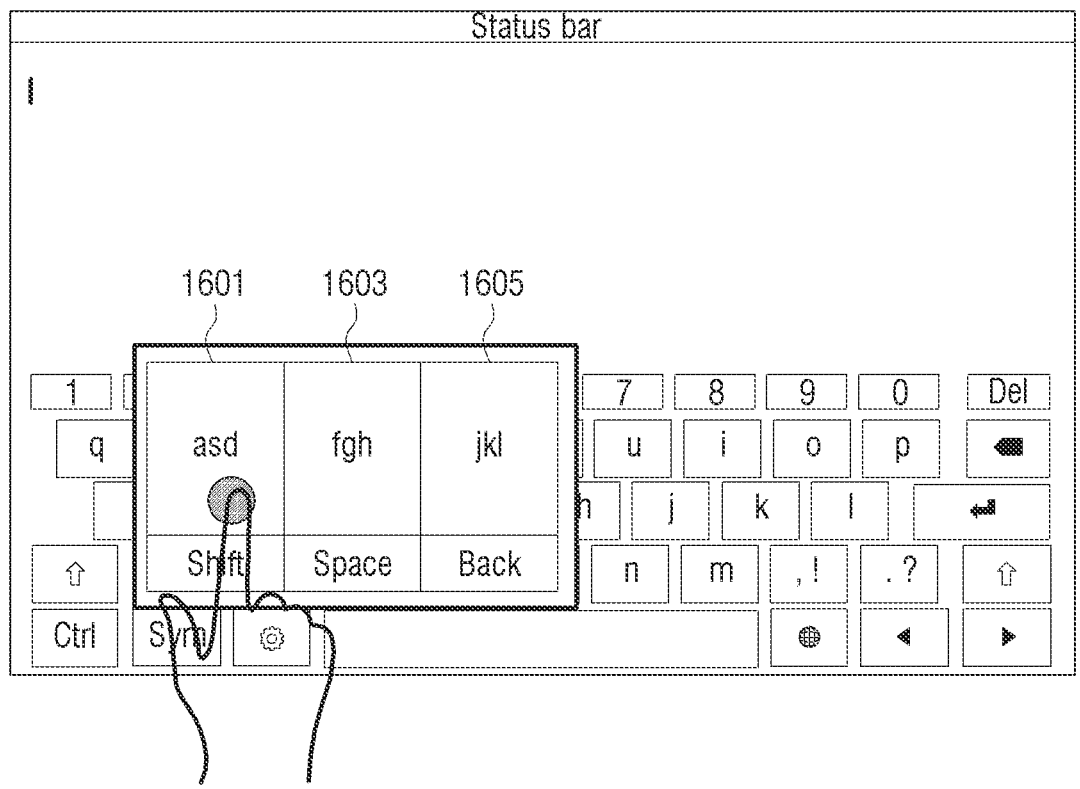
Figure 16C:
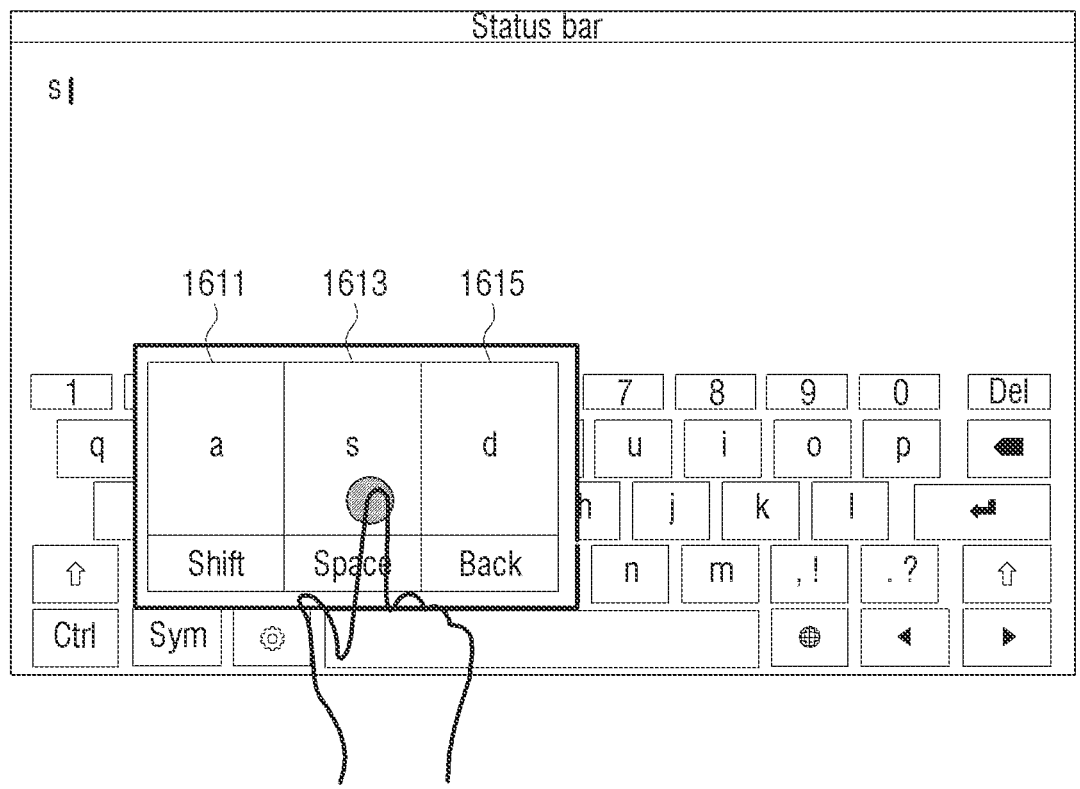

FIGS. 16A to 16C are diagrams for describing an example in which text using a sub keypad is input according to an embodiment of the present disclosure.

Referring to FIG. 16A, when the event inputting the text is generated, the controller 130 controls the display 120 to display the main keypad. In this case, as illustrated in FIG. 16A, the user interaction touching an 's' portion which is one of the plurality of character keys included in the displayed main keypad may be input to the input unit 110. Referring to FIG. 16B, the controller 130 controls the display 120 to display the sub keypad classifying the plurality of character keys present in a column including the 's' which is the touched character key into a plurality of key groups 1601, 1603, and 1605 in the user designated area. When the key group 1601 including the 's' which is the character key to be input among the plurality of displayed key groups 1601, 1603, and 1605 is touched, the controller 130 may control the display 120 to display the plurality of character keys 1611, 1613, and 1615 included in the touched key group, as illustrated in FIG. 16C. Further, when the character key 1613 representing the 's' which is one of the plurality of character keys 1611, 1613, and 1615 is touched, the controller 130 inputs the 's' which is the touched character key.

In the case of using the sub keypad as described above, the depth of the interaction for inputting the text may be increased. However, in the case of the user which may manipulate only a portion of the whole display screen, it is preferable to display the keypad in the area which may be manipulated by the user even though the depth is increased.

Figure 17A:
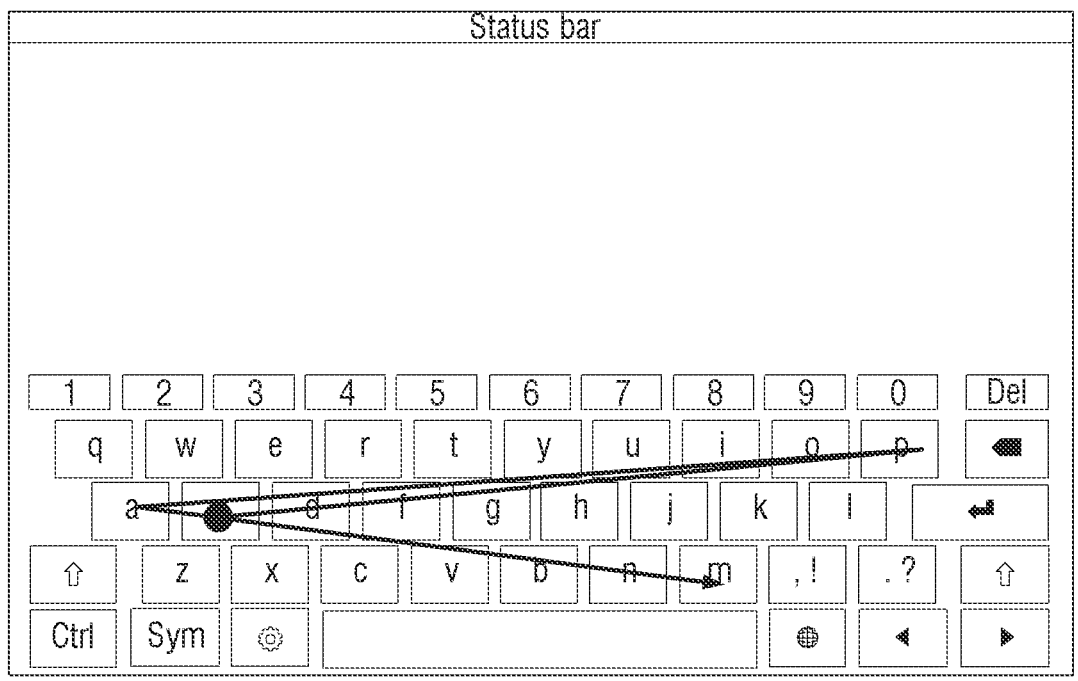
FIGS. 17A and 17B are diagrams for describing a difference in a user operation movement radius, according to an embodiment of the present disclosure.
Figure 17B:
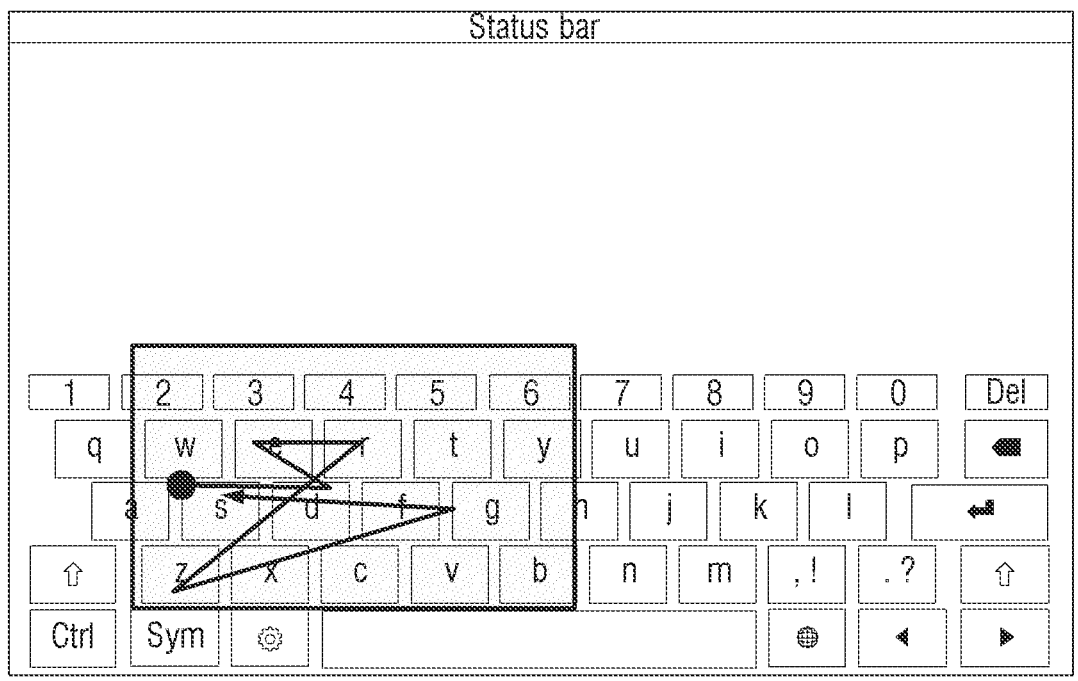

FIGS. 17A and 17B are diagrams illustrating a user manipulation moving radius when the word 'SPAM' is typed according to an embodiment of the present disclosure.

Referring to FIG. 17A, the user interaction is required over the whole area of the display screen, but in the case in which the sub keypad is displayed in the user designated area as illustrated in FIG. 17B, the same text may be input only by the movement of the use's finger in the smaller area.

Figure 18A:
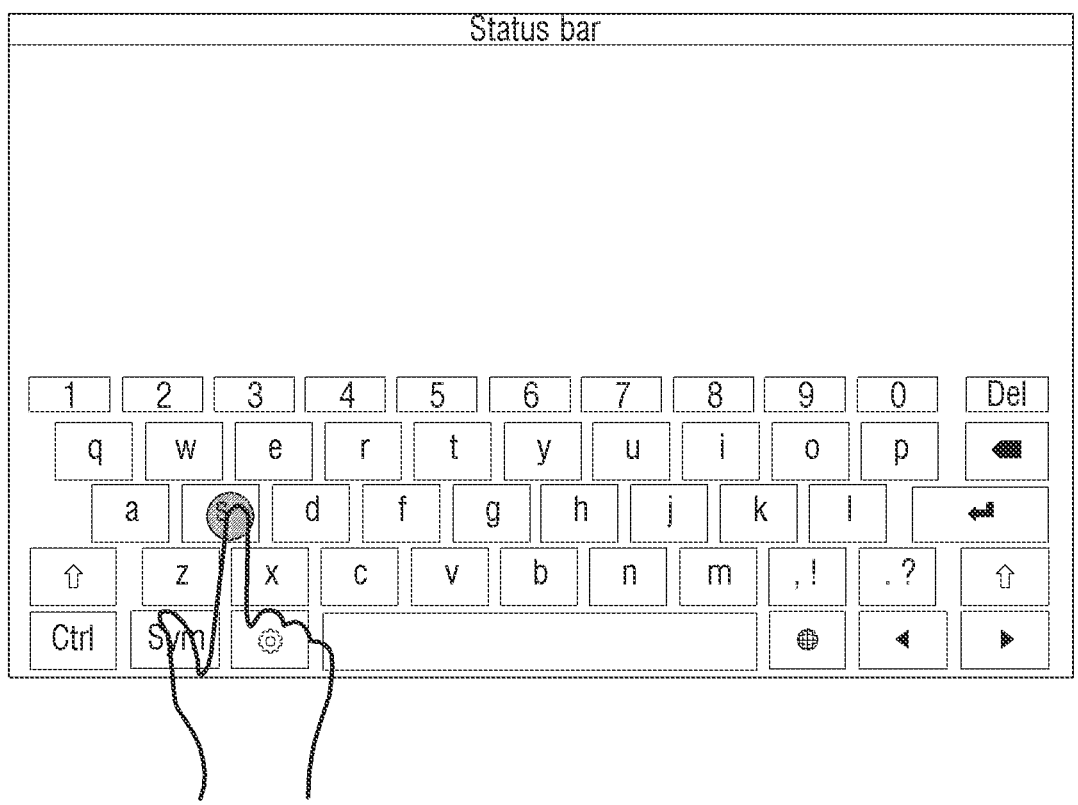
FIGS. 18A, 18B, and 18C are diagrams for describing a user interaction removing a sub keypad, according to an embodiment of the present disclosure.
Figure 18B:
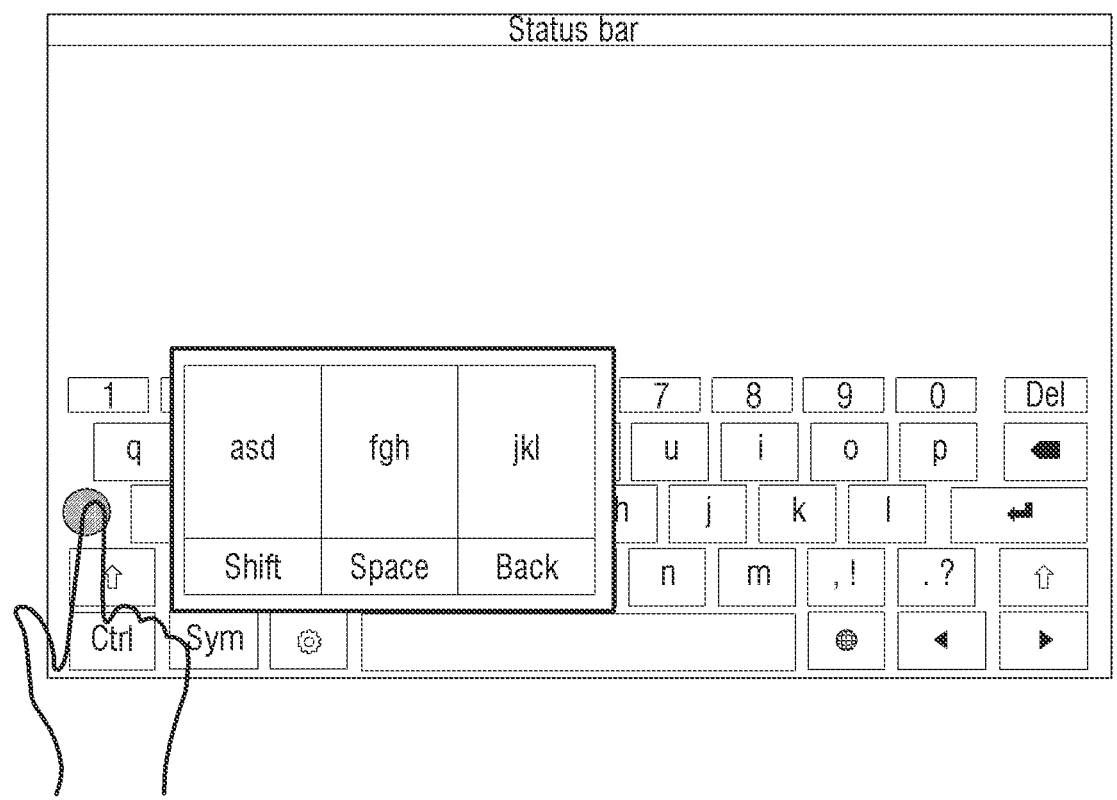
Figure 18C:
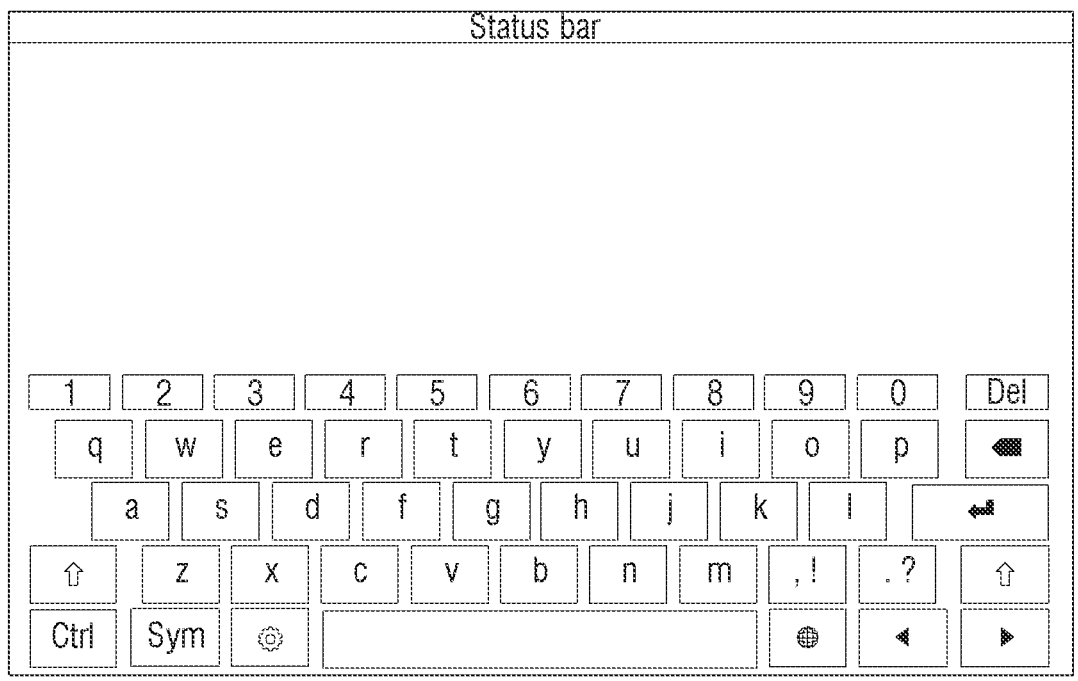

FIGS. 18A to 18C are diagrams for describing a user interaction removing a sub keypad, according to an embodiment of the present disclosure.

Referring to FIG. 18A, when the user interaction tapping the display screen other than the user designated area is input to the input unit 110 while the sub keypad is displayed, the controller 130 may remove the sub keypad. Referring to FIG. 18A, when one of the plurality of character keys included in the main keypad is touched, the controller 130 controls the display 120 to display the sub keypad in the user designated area. When the main keypad does not input the character keys which the user wants to input but inputs character keys of another column, there is a need to remove the sub keypad and return to the main keypad. Therefore, as illustrated in FIG. 18B, when the user interaction tapping an area of the display screen other than the user designated area is input to the input unit 110 while the sub keypad is displayed, the controller 130 may control the display 120 to remove the displayed sub keypad and again display the main keypad. In FIG. 18C, it may be confirmed that only the main keypad is again displayed and the user may again input his/her desired character key portion.

According to an embodiment of the present disclosure, the controller 130 controls the display 120 to display at least one of the GUI and a portion of the display screen in the user designated area is mostly described above. According to another embodiment of the present disclosure, the controller 130 may control the display 120 to display various kinds of screens such as a screen for playing contents like moving pictures and a screen for controlling a device like a setting menu in the user designated area.

Through the display apparatus 100 as described above, the user may use the information intensively displayed in the user designated area to recognize the information provided from the whole display screen even within the limited view. Further, the user may manipulate the display apparatus 100 even by the limited motion.

A screen display method of the display apparatus 100 is described below with reference to FIGS. 19 to 21.

Figure 19:
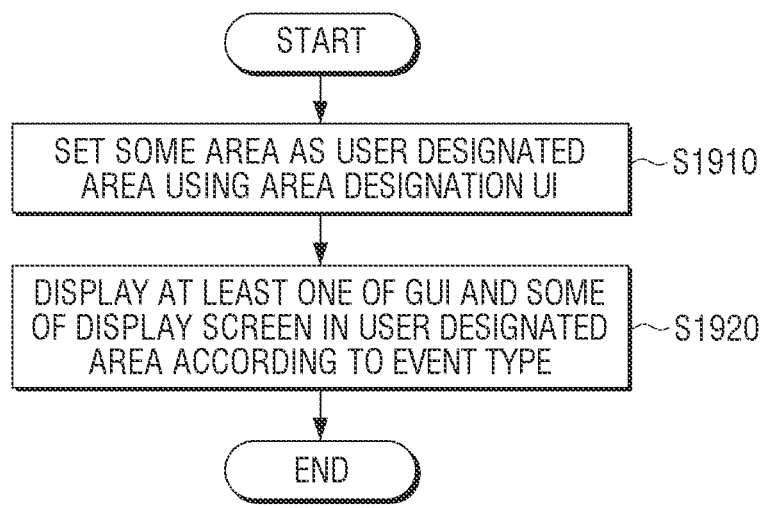
FIGS. 19, 20, and 21 are flow charts for describing a screen display method of a display apparatus, according to various embodiments of the present disclosure.

FIG. 19 is a flow chart for describing a method of controlling a display apparatus according to an embodiment of the present disclosure.

Referring to FIG. 19, the display apparatus 100 sets an area of the display screen as the user designated area through the area designation UI at operation S1910. The area designation UI may be the UI including the grid on the display screen. However, the area designation UI is not limited thereto and may be various types of UIs such as UI receiving the coordinate values of the area to be designated. For example, when the area designation UI is the UI including the grid, the display apparatus 100 uses the grid to set at least one of the position and the size of the user designated area. The display apparatus 100 may set a method to sort the GUI or a portion of the display screen which will be displayed in the user designated area.

When the setting of the user designated area is completed and the preset event is generated, the display apparatus 100 displays at least one of the GUI and a portion of the display screen in the set user designated area according to the generated event type at operation S1920. For example, when the event providing the pop-up information is generated, the display apparatus 100 may display the pop-up window including the pop-up information in the set user designated area.

As another example, when the event inputting the user interaction tapping the display screen is generated, the display apparatus 100 displays an area of the display screen of the position when the user interaction is input in the user designated area. The display apparatus 100 may display the guide UI guiding the actual position and size of the screen displayed in the user designated area at the position where the user interaction is input. When the event inputting the user interaction making a drag in succession of the user interaction tapping the display screen is generated, the display apparatus 100 may display a portion of the display screen of the position where the user interaction changed by the user interaction making a drag is input in the user designated area. Since the guide UI is displayed at the position where the user interaction is input, it may be understood that the display apparatus 100 displays a portion of the display screen guided by the guide UI in the user designated area.

As another example, when the event inputting the text is generated, the display apparatus 100 displays the main keypad. When one of the plurality of character keys included in the main keypad is touched, the display apparatus 100 displays the sub keypad classifying the plurality of character keys present in the column including the touched character key into the plurality of key groups in the user designated area. When one of the plurality of key groups is touched, the display apparatus 100 displays the plurality of character keys included in the touched key group. When one of the plurality of character keys is touched, the display apparatus 100 inputs the touched character keys. When the unwanted sub keypad is displayed in the user designated area by the wrong key input, the display apparatus 100 needs to remove the sub keypad. For example, when the user interaction tapping the display screen other than the user designated area is input while the sub keypad is displayed, the display apparatus 100 may remove the sub keypad.

Figure 20:
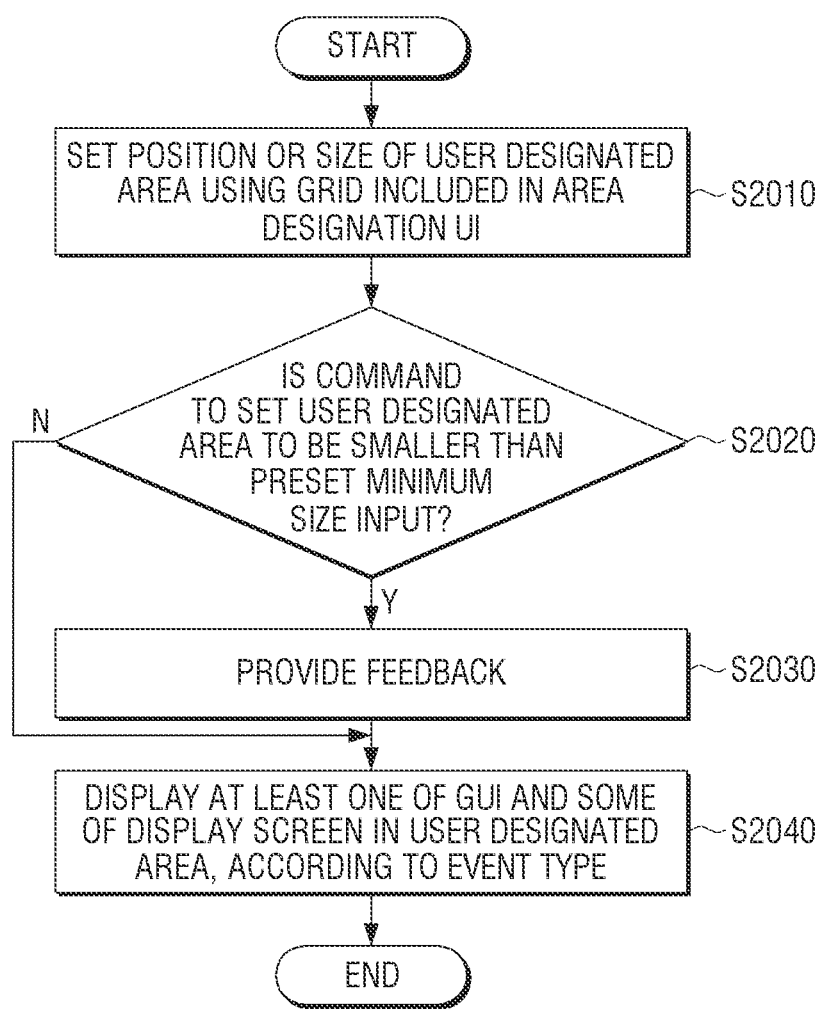

FIG. 20 is a flow chart for describing a screen display method of a display apparatus according to another embodiment of the present disclosure.

Referring to FIG. 20, the display apparatus 100 may use the grid included in the area designation UI to set the position or the size of the user designated area at operation S2010. The setting method may be implemented by various methods, such as a method of selecting an area by tapping a cell divided into the grid, a method of selecting an input drawn into the screen, a method of selecting an area as a diagonal line, etc.

The display apparatus 100 may also change the position or the size of the user designated area. The display apparatus 100 may previously set the size of the minimum area required for the information transfer. If the user command to set the size of the user designated area to be smaller than the preset minimum size is input at operation S2020, the display apparatus 100 provides feedback including the message that the size of the user designated area may not be reduced at operation S2030. The method of providing a feedback may be implemented by various methods such as a method of providing a visual feedback, a method of providing an auditory feedback, and a combined method thereof. When the setting of the user designated area is completed and then the preset event is generated, the display apparatus 100 displays at least one of the GUI and a portion of the display screen in the set user designated area according to the event type at operation S2040. In addition to the event type as described with reference to FIG. 19, when the scrolling event is generated, the display apparatus 100 may also display a lowermost item of a list in the user designated area, temporarily extending the scroll range.

Figure 21:
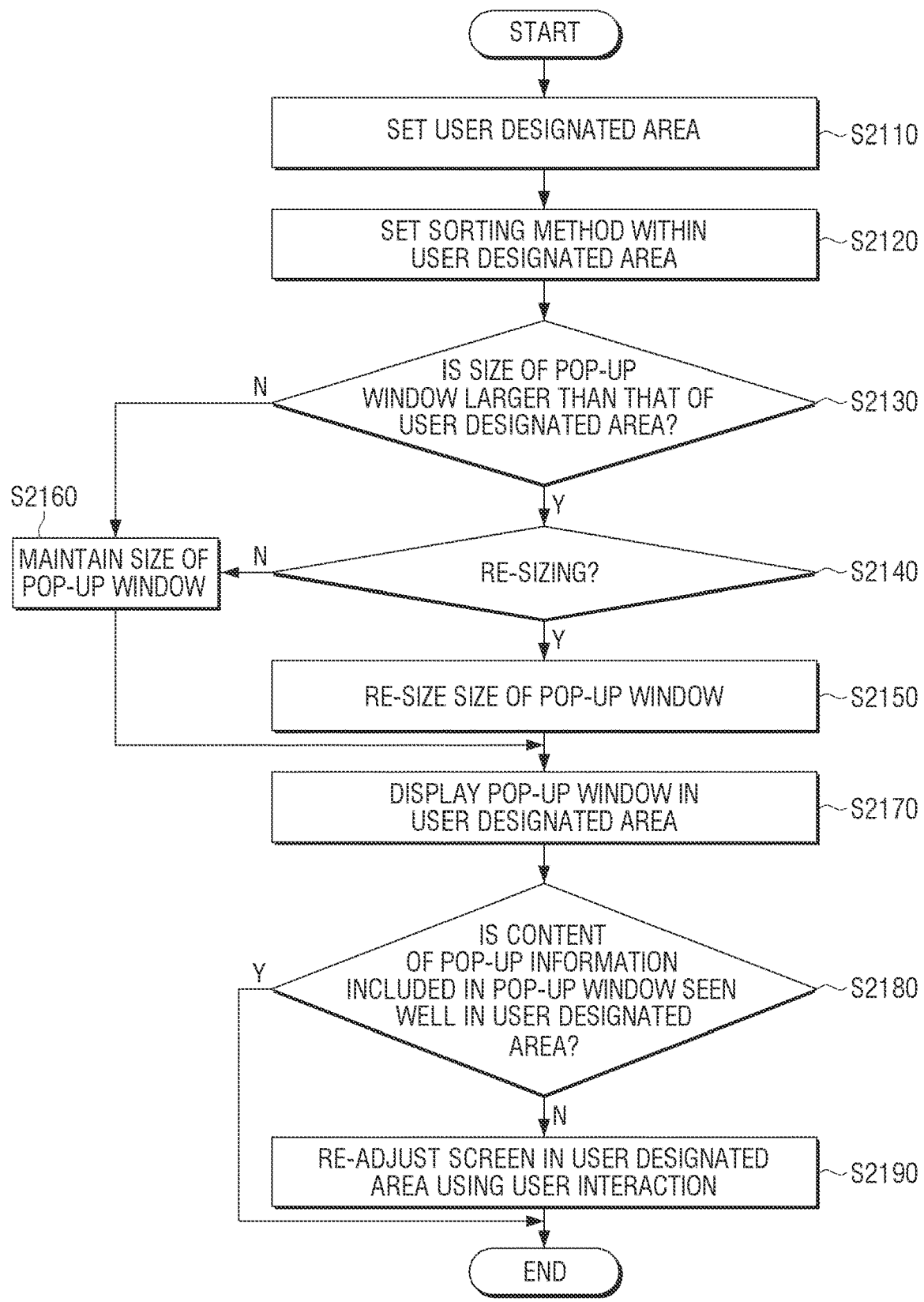

FIG. 21 is a flow chart for describing a screen display method of a display apparatus 100 according to another embodiment of the present disclosure.

Referring to FIG. 21, the display apparatus 100 first sets the user designated area at operation S2110. For example, the display apparatus 100 may set the user designated area using the area designation UI including the grid. After at least one of the position and the size of the user designated area is set, the display apparatus 100 sets a method to sort at least one of the GUI and a portion of the display screen in the user designated area at operation S2120. The display apparatus 100 may set a sorting method in horizontal and vertical positions in the user designated area and the font size. For setting a sorting method, the display apparatus 100 may also use the additional UI.

When the user designated area is set and the event providing the pop-up information is generated, the display apparatus 100 displays the pop-up window including the pop-up information in the user designated area. The display apparatus 100 determines whether the size of the pop-up window is larger than that of the user designated area at operation S2130. When the size of the pop-up window is larger than that of the user designated area at operation S2130, the display apparatus 100 determines whether to re-size the size of the pop-up window at operation S2140. For example, the size of the pop-up window may be fixed not to re-size the pop-up window, depending on the attributes of applications providing the pop-up window. If it is determined that the pop-up window is re-sized at operation S2140, the display apparatus 100 re-sizes the size of the pop-up window, adjusting the size of the user designated area at operation S2150. For example, when the vertical length of the pop-up window is longer than that of the user designated area, the display apparatus 100 may re-size the pop-up window by the method of generating a vertical scroll bar. When the size of the pop-up window is smaller than that of the user designated area at operation S2130 or may not be re-sized at operation S2140, the display apparatus 100 maintains the size of the pop-up window at operation S2160.

The display apparatus 100 displays the pop-up window which is re-sized or keeps a size in the user designated area at operation S2170. One of the reasons of intensifying information in the user designated area is to improve the legibility of information. When information displayed in the user designated area is not seen well, additional manipulations for improving legibility may be required. The display apparatus 100 determines whether the contents of the pop-up information included in the pop-up window are seen well in the user designated area at operation S2180. When the legibility of information is reduced at operation S2180, the display apparatus 100 receives the user interaction to readjust the screen in the user designated area at operation S2190. For example, the display apparatus 100 receives the user interaction zooming in the screen or the user interaction moving the screen to change the screen displayed in the user designated area to correspond thereto.

As described above, the method of displaying the display apparatus 100 intensively displays information in the user designated area to enable a user having limited view or motion to more easily recognize and operate the information displayed on the whole display apparatus 100.

As described above, according to various embodiments of the present disclosure, the user may more easily recognize the important information without missing by intensively displaying the information in the specific area. Further, the operation of the whole screen may be performed only by the user interaction in the specific area Further, a program code for executing the display method according to various embodiments of the present disclosure as described above may be stored in various types of recording media. The program code may be stored in various types of recording media which may be read by a terminal, such as a RAM, a flash memory, a ROM, an erasable programmable ROM (EPROM), an electronically erasable and programmable ROM (EEPROM), a register, a hard disc, a removable disc, a memory card, a universal serial bus (USB) memory, and a compact disc ROM (CD-ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a display apparatus, the method comprising:

in response to a user's touch position, setting a user interface (UI) providing screen information on a predetermined area to be displayed in a first position;

in response to a first touch input received at a second position on a display, displaying, in the first position, first screen information on a first area determined in response to the second position; and in response to a second touch input received at a third position on the display while the first screen information is displayed in the first position, displaying, in the first position, second screen information by changing the first screen information to the second screen information, wherein the second screen information is on a second area determined in response to the third position, and wherein the method further comprises displaying a guide UI on the first area and the second area while receiving the first touch input and the second touch input, the guide UI being for guiding an actual position and size of an area displayed in the first area and the second area.

2. The method of claim 1, wherein the setting of the UI providing the screen information comprises:

displaying an area designation UI which is an UI including a grid on the display; and setting at least one of a position or a size of the UI providing the screen information using the grid of the area designation UI.

3. The method of claim 2, wherein the setting of at least one of the position or the size of the UI providing the screen information comprises:

in response to a user command to set the size of the UI providing the screen information to be smaller than a predetermined minimum size being input, providing feedback including a message that the size of the UI providing the screen information is not able to be reduced.

4. The method of claim 1, further comprising:

in response to an event providing pop-up information being generated, displaying a pop-up window including the pop-up information in the first position.

5. The method of claim 4, further comprising:

in response to a size of the pop-up window being larger than that of the UI providing the screen information, re-sizing the pop-up window to be displayed in the first position.

6. The method of claim 1, further comprising:
in response to an event, inputting a user interaction making a drag from a third position to a fourth position in succession of the user interaction tapping the display, being generated, displaying, in the first position, fourth screen information on an area determined in response to the fourth position.

7. The method of claim 1, further comprising:
displaying a main keypad in response to an event inputting a text being generated;
in response to one of a plurality of character keys included in the main keypad being touched, displaying a sub keypad classifying the plurality of character keys present in a column including the touched character key into a plurality of key groups in the first position;
in response to one of the plurality of key groups being touched, displaying the plurality of character keys included in the touched key group; and
in response to one of the plurality of character keys being touched, inputting the touched character key.

8. The method of claim 7, further comprising:
removing the sub keypad in response to a user interaction tapping a position other than the first position being input while the sub keypad is displayed.

9. A display apparatus comprising:
a display;
an input interface configured to receive a user touch input; and
at least one processor configured to:
in response to a user's touch position, set a user interface (UI) providing screen information on a predetermined area to be displayed in a first position,
in response to a first touch input received at a second position on the display through the input interface, display, in the first position, first screen information on a first area determined in response to the second position, and
in response to a second touch input received at a third position on the display through the input interface while the first screen information is displayed in the first position, display, in the first position, second screen information by changing the first screen information to the second screen information,
wherein the second screen information is on a second area determined in response to the third position, and
wherein the at least one processor is further configured to display a guide UI on the first area and the second area while receiving the first touch input and the second touch input, the guide UI being for guiding an actual position and size of an area displayed in the first area and the second area.

10. The display apparatus of claim 9, wherein the at least one processor is further configured to:
control the display to display an area designation UI which is an UI including a grid on the display, and
set at least one of a position or a size of the UI providing the screen information using the grid of the area designation UI.

11. The display apparatus of claim 10, wherein the at least one processor is further configured to:
in response to a user command to set the size of the UI providing the screen information to be smaller than a predetermined minimum size being input, provide feedback including a message that the size of the UI providing the screen information is not able to be reduced.

12. The display apparatus of claim 9, wherein the at least one processor is further configured to:
in response to an event providing pop-up information being generated, control the display to display a pop-up window including the pop-up information in the first position.

13. The display apparatus of claim 12, wherein the at least one processor is further configured to:
in response to a size of the pop-up window being larger than that of the UI providing the screen information, re-size the pop-up window to be displayed in the first position.

14. The display apparatus of claim 9, wherein the at least one processor is further configured to:
in response to an event, inputting a user interaction making a drag from a third position to a fourth position in succession of the user interaction tapping the display, being generated, control the display to display, in the first position, fourth screen information on an area determined in response to the fourth position.

15. The display apparatus of claim 9, wherein the at least one processor is further configured to:
control the display to display a main keypad in response to an event inputting a text being generated,
in response to one of a plurality of character keys included in the main keypad being touched, display a sub keypad classifying the plurality of character keys present in a column including the touched character key into a plurality of key groups in the first position,
in response to one of the plurality of key groups being touched, control the display to display the plurality of character keys included in the touched key group, and
in response to one of the plurality of character keys being touched, input the touched character key.

16. The display apparatus of claim 15, wherein the at least one processor is further configured to:
remove the sub keypad based on in response to a user interaction tapping a position other than the first position being input while the sub keypad is displayed.

17. At least one non-transitory computer readable medium comprising instructions that, in response to being executed by at least one processor, cause the processor to execute a program comprising instructions for:
setting a user interface (UI) providing screen information on a predetermined area in response to a user's touch position to be displayed in a first position;
in response to a first touch input received at a second position on a display, displaying, in the first position, first screen information on a first area determined in response to the second position; and
in response to a second touch input received at a third position on the display while the first screen information is displayed in the first position, displaying, in the first position, second screen information by changing the first screen information to the second screen information,
wherein the second screen information is on a second area determined in response to the third position, and
wherein the method further comprises displaying a guide UI on the first area and the second area while receiving the first touch input and the second touch input, the guide UI being for guiding an actual position and size of an area displayed in the first area and the second area.

* * * * *